United States Patent
Sommers et al.

(10) Patent No.: US 11,388,081 B1
(45) Date of Patent: Jul. 12, 2022

(54) METHODS, SYSTEMS, AND COMPUTER READABLE MEDIA FOR IMPAIRMENT TESTING USING AN IMPAIRMENT DEVICE

(71) Applicant: Keysight Technologies, Inc., Santa Rosa, CA (US)

(72) Inventors: Christian Paul Sommers, Bangor, CA (US); Matthew R. Bergeron, Sunol, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/217,920

(22) Filed: Mar. 30, 2021

(51) Int. Cl.
| | |
|---|---|
| H04L 12/26 | (2006.01) |
| H04L 43/50 | (2022.01) |
| H04L 43/04 | (2022.01) |
| H04L 49/10 | (2022.01) |
| H04L 49/25 | (2022.01) |

(Continued)

(52) U.S. Cl.
CPC ............. *H04L 43/50* (2013.01); *H04L 43/04* (2013.01); *H04L 43/0823* (2013.01); *H04L 49/10* (2013.01); *H04L 49/25* (2013.01); *H04L 49/70* (2013.01)

(58) Field of Classification Search
CPC ..... H04L 43/50; H04L 43/04; H04L 43/0823; H04L 49/10; H04L 49/25; H04L 49/70
See application file for complete search history.

(56) References Cited

U.S. PATENT DOCUMENTS

| | | | |
|---|---|---|---|
| 4,792,753 | A | 12/1988 | Iwai |
| 5,247,517 | A | 9/1993 | Ross et al. |
| 5,343,463 | A | 8/1994 | Van Tetering et al. |

(Continued)

FOREIGN PATENT DOCUMENTS

| | | |
|---|---|---|
| CN | 107104903 A | 8/2017 |
| EP | 0895375 A2 | 2/1999 |

(Continued)

OTHER PUBLICATIONS

"TekExpress USB 3.0 (USB-RMT) Automated Receiver Compliance and Margin Test Solutions," Tektronix, pp. 1-154 (2021).

(Continued)

*Primary Examiner* — Philip C Lee

(57) ABSTRACT

According to one method, the method occurs during a test session for testing a system under test (SUT) and at a network test system comprising physical application-specific integrated circuit (ASIC) switching resources, wherein the network test system emulates a data center switching fabric comprising virtualized data center switching fabric elements: transmitting, to an inline impairment device, a test packet via an egress portion of an external physical port interface associated with the network test system, wherein the inline impairment device is connected via the external physical port interface associated with the network test system; receiving, from the inline impairment device, an impaired packet via an ingress portion of the external physical port interface associated with the network test system, wherein the impaired packet is generated when the impairment device applies at least one impairment to the test packet; and transmitting, using one or more of the virtualized data center switching fabric elements, the impaired packet to the SUT.

20 Claims, 11 Drawing Sheets

(51) Int. Cl.
*H04L 49/00* (2022.01)
*H04L 43/0823* (2022.01)

(56) References Cited

U.S. PATENT DOCUMENTS

| | | | |
|---|---|---|---|
| 5,390,314 A | 2/1995 | Swanson |
| 5,477,531 A | 12/1995 | McKee et al. |
| 5,535,338 A | 7/1996 | Krause et al. |
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,751,963 A | 5/1998 | Umetsu |
| 5,761,486 A | 6/1998 | Watanabe et al. |
| 5,787,147 A | 7/1998 | Gundersen |
| 5,787,253 A | 7/1998 | McCreery et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 5,991,265 A | 11/1999 | Lincoln |
| 6,011,777 A | 1/2000 | Kunzinger |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,252,891 B1 | 6/2001 | Perches |
| 6,279,124 B1 | 8/2001 | Brouwer et al. |
| 6,295,557 B1 | 9/2001 | Foss et al. |
| 6,314,531 B1 | 11/2001 | Kram |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,414,939 B1 | 7/2002 | Yamato |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,529,475 B1 | 3/2003 | Wan et al. |
| 6,535,487 B1 | 3/2003 | Biswas et al. |
| 6,545,979 B1 | 4/2003 | Poulin |
| 6,549,517 B1 | 4/2003 | Aweya et al. |
| 6,601,020 B1 | 7/2003 | Myers |
| 6,621,805 B1 | 9/2003 | Kondylis et al. |
| 6,678,246 B1 | 1/2004 | Smyth |
| 6,691,167 B2 | 2/2004 | Procopio et al. |
| 6,717,917 B1 | 4/2004 | Weissberger et al. |
| 6,785,238 B1 | 8/2004 | Kago |
| 6,826,259 B2 | 11/2004 | Hoffman |
| 6,845,352 B1 | 1/2005 | Wang |
| 6,917,595 B2 | 7/2005 | Chang et al. |
| 7,039,712 B2 | 5/2006 | Valavi et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,222,255 B1 | 5/2007 | Claessens et al. |
| 7,304,951 B2 | 12/2007 | Rhee |
| 7,327,686 B2 | 2/2008 | Standridge |
| 7,342,897 B1 | 3/2008 | Nader et al. |
| 7,366,174 B2 | 4/2008 | MacFaden et al. |
| 7,418,492 B1 | 8/2008 | Cohen et al. |
| 7,468,947 B2 | 12/2008 | Mannal et al. |
| 7,486,728 B2 | 2/2009 | Park |
| 7,507,948 B2 | 3/2009 | Park et al. |
| 7,525,473 B2 | 4/2009 | Chu et al. |
| 7,633,939 B2 | 12/2009 | Curran-Gray et al. |
| 7,783,463 B2 | 8/2010 | Herro |
| 7,840,664 B2 | 11/2010 | Dugatkin et al. |
| 7,873,056 B2 | 1/2011 | Higuchi et al. |
| 7,908,130 B2 | 3/2011 | Van Ginkel et al. |
| 7,979,225 B2 | 7/2011 | Muller et al. |
| 8,718,070 B2 | 5/2014 | Koponen et al. |
| 8,761,187 B2 | 6/2014 | Barde |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 9,042,245 B2 | 5/2015 | Tzannes et al. |
| 9,049,271 B1 | 6/2015 | Hobbs et al. |
| 9,065,770 B2 | 6/2015 | Chew et al. |
| 9,231,849 B2 | 1/2016 | Hyoudou et al. |
| 9,294,296 B2 | 3/2016 | Kirschnick et al. |
| 9,300,565 B2 | 3/2016 | Robitaille et al. |
| 9,503,382 B2 | 11/2016 | DeCusatis et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,819,551 B2 | 11/2017 | Forster et al. |
| 9,819,553 B2 | 11/2017 | Robitaille et al. |
| 9,898,317 B2 | 2/2018 | Nakil et al. |
| 9,971,620 B2 * | 5/2018 | Karnes .............. G06F 9/45558 |
| 10,015,072 B2 | 7/2018 | Cantwell et al. |
| 10,063,473 B2 | 8/2018 | Wenig |
| 10,181,912 B1 | 1/2019 | Callaghan et al. |
| 10,579,408 B2 | 3/2020 | Wang et al. |
| 10,623,296 B2 | 4/2020 | Haramaty et al. |
| 10,686,671 B1 | 6/2020 | Mozumdar et al. |
| 10,733,088 B1 | 8/2020 | Sommers |
| 10,742,533 B2 | 8/2020 | Yadav et al. |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 2001/0016867 A1 | 8/2001 | Hu et al. |
| 2002/0056100 A1 | 5/2002 | Shimomura et al. |
| 2002/0085502 A1 | 7/2002 | Chheda et al. |
| 2002/0105911 A1 | 8/2002 | Pruthi et al. |
| 2002/0138226 A1 | 9/2002 | Doane |
| 2002/0162059 A1 | 10/2002 | McNeely et al. |
| 2002/0172205 A1 | 11/2002 | Tagore-Brage et al. |
| 2002/0184527 A1 | 12/2002 | Chun et al. |
| 2003/0009544 A1 | 1/2003 | Wach |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0188003 A1 | 10/2003 | Sylvest et al. |
| 2003/0191590 A1 | 10/2003 | Narayan et al. |
| 2003/0231741 A1 | 12/2003 | Rancu et al. |
| 2004/0111502 A1 | 6/2004 | Oates |
| 2004/0111519 A1 | 6/2004 | Fu et al. |
| 2004/0117474 A1 | 6/2004 | Ginkel et al. |
| 2004/0190449 A1 | 9/2004 | Mannal et al. |
| 2004/0190606 A1 | 9/2004 | Deshpande |
| 2004/0236866 A1 | 11/2004 | Dugatkin et al. |
| 2005/0021715 A1 | 1/2005 | Dugatkin et al. |
| 2005/0041592 A1 | 2/2005 | Hannel et al. |
| 2006/0002305 A1 | 1/2006 | Ginzburg |
| 2007/0133441 A1 | 6/2007 | Kang et al. |
| 2007/0165531 A1 | 7/2007 | Labrador et al. |
| 2008/0186968 A1 | 8/2008 | Farinacci et al. |
| 2009/0168720 A1 | 7/2009 | Vinayakray-Jani et al. |
| 2009/0207752 A1 | 8/2009 | Bugenhagen |
| 2010/0008305 A1 | 1/2010 | Yeo et al. |
| 2010/0153055 A1 | 6/2010 | Mucha et al. |
| 2010/0299433 A1 | 11/2010 | De Boer et al. |
| 2013/0013107 A1 | 1/2013 | Felique |
| 2013/0064095 A1 | 3/2013 | Shew et al. |

(56) References Cited

U.S. PATENT DOCUMENTS

| | | | |
|---|---|---|---|
| 2013/0070777 | A1 | 3/2013 | Hutchison et al. |
| 2014/0047125 | A1 | 2/2014 | Hyoudou et al. |
| 2014/0160961 | A1 | 6/2014 | Dragulescu et al. |
| 2014/0298335 | A1* | 10/2014 | Regev .................. G06F 11/203 718/1 |
| 2014/0321285 | A1 | 10/2014 | Chew et al. |
| 2015/0317169 | A1 | 11/2015 | Sinha et al. |
| 2015/0334030 | A1 | 11/2015 | Vasseur et al. |
| 2015/0365288 | A1 | 12/2015 | Van Der et al. |
| 2017/0126588 | A1 | 5/2017 | Anand et al. |
| 2017/0180233 | A1 | 6/2017 | Nistor et al. |
| 2017/0180238 | A1 | 6/2017 | Telle |
| 2017/0214703 | A1 | 7/2017 | Tekchandani |
| 2017/0364794 | A1 | 12/2017 | Mahkonen et al. |
| 2018/0041399 | A1 | 2/2018 | Robitaille et al. |
| 2018/0106702 | A1 | 4/2018 | Fattu et al. |
| 2019/0140893 | A1 | 5/2019 | Artzi et al. |
| 2019/0222481 | A1 | 7/2019 | Hira |
| 2019/0372881 | A1 | 12/2019 | Hu et al. |
| 2020/0021512 | A1 | 1/2020 | Naskar et al. |
| 2020/0028772 | A1 | 1/2020 | Laslau |
| 2020/0112524 | A1 | 4/2020 | Sindhu et al. |
| 2020/0133688 | A1 | 4/2020 | Shinde et al. |
| 2020/0195519 | A1 | 6/2020 | Di Martino |
| 2020/0296023 | A1 | 9/2020 | Kumar et al. |
| 2020/0313999 | A1 | 10/2020 | Lee et al. |
| 2020/0366588 | A1* | 11/2020 | Bergeron ................ H04L 43/12 |

FOREIGN PATENT DOCUMENTS

| | | |
|---|---|---|
| JP | 2000049863 | 2/2000 |
| JP | 2000278265 | 10/2000 |
| JP | 4620103 B2 | 1/2011 |
| WO | 02056541 A2 | 7/2003 |
| WO | 2021015802 A1 | 1/2021 |

OTHER PUBLICATIONS

"QSFP DD Loopback Modules," High Speed IO, Amphenol ICC, pp. 1-2 (2021).

Sultana et al., "Flightplan Dataplane Disaggregation and Placement for P4 Programs," 18th {USENIX} Symposium on Networked Systems Design and Implementation, pp. 1-22 (2021).

"Network Emulator II —Ethernet 10GE, 1GE, and 100MbE Ethernet Impairment Emulation," Keysight Technologies, pp. 1-8 (Oct. 22, 2020).

"The Value of Network Impairment Testing in Power Grids," Calnex SNE, pp. 1-2 (2006).

"Spirent Network Emulator," Spirent Communications, pp. 1-11 (Apr. 2021).

"Ethernet Network Emulator," MGA2510 Product Brief, Aukua Systems, pp. 1-2 (2021).

"Chimera Network Impairment Emulator," Xena Networks, pp. 1-2 (2021).

Commonly-assigned, co-pending U.S. Appl. No. 17/542,011 for "Methods, Systems, and Computer Readable Media for Providing Adaptive Background Test Traffic in a Test Environment." (Unpublished, filed Dec. 3, 2021).

Notice of Allowance and Fee(s) Due for U.S. Appl. No. 17/067,627 (dated Oct. 22, 2021).

Commonly-assigned, co-pending U.S. Appl. No. 17/498,723 for "Methods, Systems, and Computer Readable Media for Recycling Background Traffic in a Test Environment," (Unpublished, filed Oct. 11, 2021).

Advisory Action for U.S. Appl. No. 17/069,768 (dated Sep. 28, 2021).

Non-Final Office Action for U.S. Appl. No. 17/198,870 (dated Sep. 17, 2021).

Notice of Allowance and Fee(s) Due for U.S. Appl. No. 17/067,627 (dated Aug. 20, 2021).

Final Office Action for U.S. Appl. No. 17/069,768 (dated Jul. 9, 2021).

Non-Final Office Action for U.S. Appl. No. 17/069,768 (dated Feb. 4, 2021).

Commonly-assigned, co-pending U.S. Appl. No. 17/067,627 for "Methods, Systems, and Computer Readable Media for Network Testing Using Switch Emulation," (Unpublished, filed Oct. 9, 2020).

Commonly-assigned, co-pending U.S. Appl. No. 17/069,768 for "Methods, Systems and Computer Readable Media for Active Queue Management," (Unpublished, filed Oct. 13, 2020).

Cao et al., "TurboNet: Faithfully Emulating Networks with Programmable Switches," IEEE, pp. 1-11 (2020).

"Datasheet—Albedo Net.Storm," Albedo Telecom, pp. 1-2 (Dec. 23, 2015).

"Albedo Net.Storm," NETSTORM.en, pp. 1-4 (2014).

Stevens, "TCP/IP Illustrated, vol. 1: The Protocols," pp. 1-3 (1994).

Nichols, "Improving Network Simulation with Feedback," IEEE, 14 pages (1998).

Li et al., "A Simulation Study of TCP Performance in ATM Networks with ABR and UBR Services," IEEE, pp. 1269-1276 (1996).

Non-Final Office Action for U.S. Appl. No. 10/317,312 (dated Jan. 30, 2006).

Kurose et al., "Computer Networking: A Top-Down Approach Featuring the Internet," pp. 167-172 (2001).

"UCB/LBNL/NINT Network Simulator-ns (version 2)," http://web.archive.org/web/20000819030658/http://www.isi.edu/nsnam/ns/, Information Sciences Institute, 4 pages (Aug. 2000).

Leon-Garcia et al., "Communication Networks Fundamentals Concepts and Key Architectures," pp. 57-63 and 575-577 (2000).

Fall et al., "Simulation-based Comparisons of Tahoe, Reno, and SACK TCP," 18 pages (Jan. 7, 1998).

Notice of Allowance and Fee(s) Due for U.S. Appl. No. 10/317,312 (dated Dec. 9, 2010).

Interview Summary for U.S. Appl. No. 10/317,312 (dated Aug. 25, 2010).

Non-Final Office Action for U.S. Appl. No. 10/317,312 (dated May 7, 2010).

Final Office Action for U.S. Appl. No. 10/317,312 (dated Mar. 26, 2009).

Non-Final Office Action for U.S. Appl. No. 10/317,312 (dated Aug. 29, 2008).

Non-Final Office Action for U.S. Appl. No. 10/317,312 (dated Mar. 17, 2008).

Final Office Action for U.S. Appl. No. 10/317,312 (dated Sep. 12, 2007).

"TCP/IP model," http://en.wikipedia.org/wiki/TCP/IP_model, 8 pages (Aug. 2007).

Non-Final Office Action for U.S. Appl. No. 10/317,312 (dated Mar. 22, 2007).

Final Office Action for U.S. Appl. No. 10/317,312 (dated Aug. 11, 2006).

Zhang et al., "HyperV: A High Performance Hypervisor for Virtualization of the Programmable Data Plane," 2017 26th International Conference on Computer Communication and Networks (ICCCN), pp. 1-9 (2017).

Cziva et al., "High-Performance Virtualized SDN Switches for Experimental Network Testbeds," SI:SC16-INDIS, pp. 1-14 (Nov. 8, 2016).

Khalidi, "SONiC: The networking switch software that powers the Microsoft Global Cloud," Blog(/en-us/blog/) Cloud Strategy, pp. 1-10 (Mar. 8, 2017).

Siron, "What is the Hyper-V Virtual Switch and How Does it Work?" Altaro, pp. 1-22 (Sep. 26, 2019).

Han et al., "Virtualization in Programmable Data Plane: A Survey and Open Challenges," IEEE Open Journal of the Communications Society, pp. 1-7 (2020).

"Networking/SAI," Open Compute, pp. 1-6 (Oct. 2020).

Zhou et al., "HyperTester: High-performance Network Testing Driven by Programmable Switches," In The 15th International Conference on emerging Networking Experiments and Technologies (CoNEXT '19), pp. 1-14 (Dec. 9-12, 2019).

(56) References Cited

OTHER PUBLICATIONS

Spirent Communications, "Cloud Computing Testing," pp. 1-10 (Apr. 2010).
Byagowi, A., et al., "Bringing the F16 Network into the Lab," OCP Global Summit, pp. 1-16 (Jan. 29, 2021).
Zhang, C., et al., "MPVisor. A Modular Programmable Data Plane Hypervisor," SOSR, pp. 1-2 (Apr. 3-4, 2017).
Tos et al., "Adaptive RTP Rate Control Method," 2011 35th IEEE Annual Computer Software and Applications Conference Workshops, pp. 1-6 (2011).
Mittal et al., "Dynamic Simulation Control with Queue Visualization," Summer Computer Simulation Conference, pp. 1-7 (Jun. 2005).
Final Office Action for U.S. Appl. No. 16/415,790 (dated Dec. 20, 2021).
Non-Final Office Action for U.S. Appl. No. 16/415,790 (dated Jun. 18, 2021).
Extended European Search Report for European Application Serial No. 19202282.0 (dated Apr. 7, 2020).
Commonly-assigned, co-pending U.S. Appl. No. 16/415,790 for "Indirect Testing Using Impairment Rules," (Unpublished, filed May 17, 2019).
Notice of Allowance and Fee(s) Due for U.S. Appl. No. 17/067,627 (dated Feb. 8, 2022).
"Agilent E4219A ATM Network Impairment Emulator," Keysight, pp. 1-5 (2021).
"INE Network Emulator Appliance," Technical Specifications, pp. 1-2 (2018).

* cited by examiner

300

| TOPOLOGY ID (TID) | TOPOLOGY DESCRIPTION |
|---|---|
| TOP_1 | 3-stage clos - [a,b,c] switches at each layer, x,y,z speeds and feeds |
| TOP_2 | 3-stage clos - [a,b,c,d] switches at each layer, x,y,z speeds and feeds |
| TOP_3 | 5-stage clos - [a,b,c] switches at each layer, v,x,y speeds and feeds |
| TOP_4 | 3-stage clos - [a,b,c] switches at PODSW, [d,e] at TORSW, [f] at SPSW, x speeds and feeds at PODSW, y speeds and feeds at TORSW, z speeds and feeds at SPSW |

| TID | ESID | LOGICAL PORT | PSID | PHYSICAL PORT |
|---|---|---|---|---|
| TOP_1 | TORSW1 | 1 | SW1 | 47 |
| TOP_1 | TORSW1 | 2 | SW1 | 14 |
| TOP_1 | TORSW1 | 3 | SW1 | 35 |
| TOP_1 | TORSW2 | 1 | SW1 | 22 |
| TOP_1 | TORSW2 | 5 | SW1 | 77 |
| TOP_1 | TORSW2 | 7 | SW1 | 62 |
| ... | ... | ... | ... | ... |
| TOP_4 | TORSW2 | 6 | SW1 | 33 |
| TOP_4 | TORSW3 | 2 | SW1 | 60 |
| TOP_4 | TORSW3 | 3 | SW1 | 26 |
| TOP_4 | TORSW3 | 4 | SW1 | 37 |
| TOP_4 | TORSW4 | 1 | SW1 | 18 |
| TOP_4 | TORSW4 | 3 | SW1 | 22 |
| TOP_4 | TORSW4 | 5 | SW1 | 23 |

FIG. 4

METHODS, SYSTEMS, AND COMPUTER READABLE MEDIA FOR IMPAIRMENT TESTING USING AN IMPAIRMENT DEVICE

TECHNICAL FIELD

The subject matter described herein relates to network testing. More specifically, the subject matter relates to methods, systems, and computer readable media for impairment testing using an impairment device.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical CPU-based server or node in the data center. In this example, each VM may execute an operating system and other software, where each VM may appear as a physical server to end users.

It will be appreciated that an emulated or virtualized switch of the type described in this disclosure is distinctly different from the entity referred to commonly in the industry as a virtual switch. More particularly, a virtual switch is a software application that runs on top of central processing unit (CPU), which allows communication between virtual machines, where the virtual machines are administered by a virtual machine hypervisor. A vSwitch does not subdivide and allocate resources of an underlying physical switch ASIC chip into multiple emulated switches, but instead creates a software representation of a completely virtual switch (i.e., there is no mapping to underlying physical switch ASIC hardware).

When testing data center equipment, it is important to make sure that testing mimics real world scenarios and conditions. For example, when testing a data center server or related applications, it may be necessary to mimic or emulate resources in the data center. For example, when testing a data center server or related applications, it may be necessary to mimic or emulate a switching fabric or other resources in the data center and to emulate or approximate various equipment or system related states, e.g., by using various test system configurations or settings and/or effecting various impairments.

Accordingly, a need exists for methods, systems, and computer readable media for impairment testing using an impairment device.

SUMMARY

Methods, systems, and computer readable media for impairment testing using an impairment device are disclosed. According to one method, the method occurs during a test session for testing a system under test (SUT) and at a network test system comprising physical application-specific integrated circuit (ASIC) switching resources, wherein the network test system emulates a data center switching fabric comprising virtualized data center switching fabric elements: transmitting, to an inline impairment device, a test packet via an egress portion of an external physical port interface associated with the network test system, wherein the inline impairment device is connected via the external physical port interface associated with the network test system; receiving, from the inline impairment device, an impaired packet via an ingress portion of the external physical port interface associated with the network test system, wherein the impaired packet is generated when the impairment device applies at least one impairment to the test packet; and transmitting, using one or more of the virtualized data center switching fabric elements, the impaired packet to the SUT.

According to one system, the system includes physical ASIC switching resources and a network test system comprising the physical ASIC switching resources, wherein the network test system emulates a data center switching fabric comprising virtualized data center switching fabric elements. The network test system is configured for: during a test session for testing a SUT: transmitting, to an inline impairment device, a test packet via an egress portion of an external physical port interface associated with the network test system, wherein the inline impairment device is connected via the external physical port interface associated with the network test system; receiving, from the inline impairment device, an impaired packet via an ingress portion of the external physical port interface associated with the network test system, wherein the impaired packet is generated when the impairment device applies at least one impairment to the test packet; and transmitting, using one or more of the virtualized data center switching fabric elements, the impaired packet to the SUT.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 3 is a diagram illustrating example switching topology configuration information;

FIG. 4 is a diagram illustrating example port mapping data for mapping emulated switch ports to physical switch ports;

DETAILED DESCRIPTION

Figure 1:
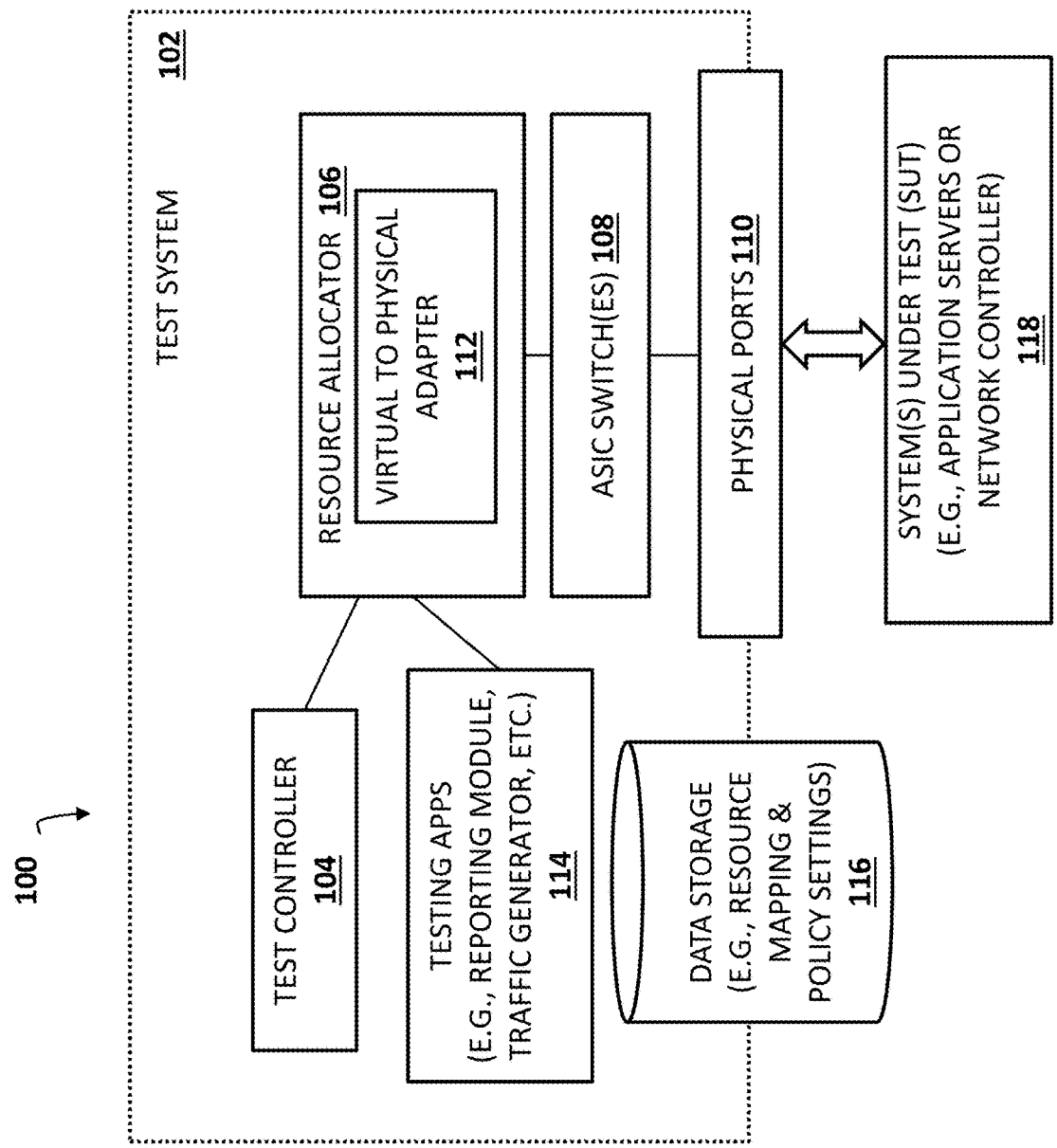
FIG. 1 is a diagram illustrating an environment for impairment testing using an impairment device.

The subject matter described herein includes methods, systems, and computer readable media for impairment testing using an impairment device. In accordance with some aspects of the subject matter described herein, a test system (e.g., one or more computing platforms, devices, or nodes) may be configured to emulate a switching fabric environment, such as virtual networking resources and/or other data center related resources, by using a switch ASIC resource and/or one or more physical switches. It will be appreciated that some embodiments include one or more emulated switches, where an emulated switch is a logically allocated portion of a physical switch ASIC that is made to look like an independent logical switch device to the environment (e.g., a device under test (DUT), a system under test (SUT), or a controller) by using a switch ASIC resource allocator. In some embodiments, the resource allocator is adapted to facilitate collection and reporting of emulated logical switch performance metric information (e.g., emulated logical switch queue depth, emulated logical switch latency, etc.) during a test run or session by a visibility module.

In accordance with some aspects of the subject matter described herein, a test system may be configured to perform impairment testing using an emulated and/or live (non-emulated) switching fabric. For example, an example test system described herein may include physical ASIC switching resources for emulating a data center switching fabric comprising virtualized data center switching fabric elements and may be configured to utilize an external impairment device for impairing one or more test packets (e.g., to or from a SUT) during a test session. In another example, an example test system described herein may test a SUT that includes a live switching fabric. In this example, e.g., as part of testing setup, an external impairment device may be inserted in or near the live switching fabric and one or more monitoring agents (e.g., network probes, taps, or analyzer modules) may be added to the live switching fabric for collecting performance metrics.

In accordance with some aspects of the subject matter described herein, impairment testing using an external impairment device may be performed, where impairments are applied and adjusted during testing based on feedback (e.g., observed performance metrics) and target information (e.g., predefined or user-specified target values or ranges for one or more performance metrics). For example, an example test system described herein may be configured to dynamically adjust impairments during a test session based on observable performance metrics (e.g., bit error rate (BER)) and a target range for the performance metrics. In this example, the testing system may perform impairment adjustments using a closed loop-type feedback control mechanism or another feedback based mechanism.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating a computing environment 100 for impairment testing using an impairment device. Computing environment 100 may include one or more networks and/or one or more computer platforms, nodes, or devices. Referring to FIG. 1, computing environment 100 may include a test system 102 and/or a SUT 118.

Test system 102 may represent any suitable entity or entities (e.g., one or more computing platforms, nodes, or devices) associated with testing SUT 118 (e.g., one or more application servers, a network controller, or a NMS). For example, test system 102 may generate and send traffic to SUT 118 and/or receive traffic from SUT 118 and may analyze one or more performance aspects associated with SUT 118.

SUT 118 may be any suitable entity or entities (e.g., devices, systems, or platforms) for receiving, processing, forwarding, and/or sending one or more messages (e.g., packets). In some embodiments, SUT 118 may include one or more portions. For example, each portion of SUT 118 may include a network node, a network switch, a network router, a network interface card, a packet forwarding device, or one or more virtual network functions (VNF). In this example, each portion of SUT 118 or a VNF thereof may be software in a virtual container or machine (VC/M) executing on shared resources (e.g., compute, storage, and network resources in a cloud computing environment). In some embodiments, each portion of SUT 118 or a VNF thereof may include processing logic (e.g., rules associated with packet forwarding/processing) that is independent or separate from another portion of SUT 118 or another VNF.

In some embodiments, test system 102 may include a stand-alone tool, a testing device, a network equipment test device or platform, or software executing on one or more processor(s). In some embodiments, test system 102 may be a single device or node or may be distributed across multiple devices or nodes. In some embodiments, test system 102 may include one or more modules for performing various test related functions. For example, test system 102 may include a traffic (e.g., packet) generator for generating test traffic and/or testing related applications (e.g., a test analyzer or test configuration manager) for testing SUT 118.

Test system 102 may include a test controller (TC) 104, resource allocator (RA) 106, physical ASIC switch(es) 108, ports 110, testing applications 114, and data storage 116. TC 104 may be any suitable entity or entities (e.g., software executing on a processor, a field-programmable gateway array (FPGA), and/or an ASIC, or a combination of software, an FPGA, and/or an ASIC) for performing one or more aspects associated with testing SUT 118 and/or various aspects thereof. In some embodiments, TC 104 may be implemented using one or more processors and/or memory. For example, TC 104 may utilize one or more processors (e.g., executing software stored in memory) to generate traffic patterns or scenarios for various message streams (e.g., flows or sessions). In another example, TC 104 may also utilize one or more processors to perform or initiate various tests and/or analyses involving test packets and/or related responses from SUT 118. In this example, TC 104 may send instructions to various modules or entities, e.g., testing applications 114, in test system 102 for controlling (e.g., to pause, (re)start, or stop) a test session.

In some embodiments, TC 104 may utilize out-of-band and/or in-band ports and/or interfaces for communicating with entities of test system 102. For example, in embodiments where TC 104 is external to RA 106, TC 104 may communicate with RA 106 via a management port or related interface.

In some embodiments, TC 104 may interact with one or more testing applications 114. Testing applications 114 may represent software for configuring test system 102 or portions thereof. In some embodiments, testing applications 114 can include, but are not limited to, visibility applications, SDN controller applications, GUI and CLI applications, and test traffic generation applications for communicating with SUT 118 and/or an emulated switching fabric environment implemented using ASIC switch(es) 108.

In some embodiments, test system 102 or aspects thereof may be controlled or defined using one or more user-definable data models. For example, test system 102 may provide a GUI to allow a user to configure or modify a switch ASIC resource allocator model, a switching model, a data center emulation or switching topology model, a traffic generator model, a network visibility model, etc. In this example, high-level or user-definable data models may be converted into lower-level data models or into computer readable instructions for implementing the user-definable data models, e.g., implementing a data center emulation model on ASIC switch(es) 108.

In some embodiments, testing applications 114 may include or utilize one or more user interfaces for receiving settings and/or configuration information for setting up a testing scenario or a related test session. For example, a user interface may include any interface usable by one or more types of user (e.g., a human or another entity like an application, a machine, or a device) to interact with test system 102 or related entities. In some embodiments, one or more user interfaces may support automation e.g., via one or more programming languages (e.g., python), a representation state transfer (REST) API, a remote procedure call API (e.g., gRPC API), a command line interface (CLI), a machine-to-machine (M2M) automation interface, and/or a web based GUI. For example, a test operator may use a web browser to interact with a web based GUI associated with TC 104 and/or testing applications 114 for programming or configuring one or more aspects for testing SUT 118. In another example, a network controller may utilize a M2M automation interface for programming or configuring one or more aspects for testing SUT 118.

In some embodiments, testing applications 114 may include or utilize a GUI or other user interface for selecting and/or configuring emulated switching fabric environments and/or other related settings (e.g., test reporting and/or network visibility settings). For example, testing applications 114 may include a web based GUI for obtaining a test operator or another entity's intent for setting up or configuring testing scenarios and/or related emulated switching fabric environments. In this example, the GUI can be used to visually describe a topology comprising one or more emulated switches and/or to indicate particular physical resources to allocate to each emulated switch. In another example, the GUI can be used to gather test session settings and/or other information.

In some embodiments, from an end user perspective, a test system related user interface may provide and/or receive configuration settings for emulated switches associated with an emulated data center environment. In such embodiments, a user can use the user interface to configure a specific data center environment in which SUT 118 will operate or interact with and can monitor performance of both SUT 118 and the performance of the emulated switches that comprise the emulated data center environment.

In some embodiments, testing applications 114 may include or utilize a traffic generator. For example, a traffic generator may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. In this example, the traffic generator may be configured to utilize user input and predefined test case templates or related data to generate one or more test cases and/or test sessions.

In some embodiments, testing applications 114 may include or utilize a reporting module and may be configurable by TC 104. For example, a reporting module may be any suitable entity or entities (e.g., software executing on a processor, an ASIC, an FPGA, or a combination of software, an ASIC, or an FPGA) for reporting various information about testing using network visibility functions and/or components (e.g., using virtual or physical probes or network taps). In this example, virtual taps or software may be configured to generate and/or provide switch metrics or other information (e.g., network telemetry, switch and/or link status information, etc.) associated with one or more virtualized switching fabric elements (e.g., emulated switches) of an emulated switching fabric environment. Continuing with this example, the reporting module may generate performance reports or test analysis reports associated with SUT 118, e.g., by utilizing the switch metrics or other information associated with packets that pass through or are generated by SUT 118.

ASIC switch(es) 108 may be any suitable entity or entities comprising one or more ASICs (and hardware, firmware, and/or software) for performing one or more functions associated with network switching. For example, ASIC switch(es) 108 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of ASIC switch(es) 108 may managed and/or allocated to provide virtualized or emulated switches by RA 106.

Ports 110 may include or utilize any suitable entity or entities (e.g., one or more network interface cards (NICs), pluggable jacks, physical processors, transceiver modules, direct-attach cables (DACs) and/or other hardware) for sending or receiving communications. For example, test system 102 may use one or more multiple ports 110 (e.g., physical connection ports) for receiving and sending various types of test packets or related data units; such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP)

messages, or reliable data protocol (RDP) messages, messages using a tunneling protocol, and/or other data units.

In some embodiments, ports 110 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 110 may include multiple port modules or groups of ports for interacting with SUT 118. For example, depending on a test operator's configuration settings or a particular test session setup, RA 106 may allocate a portion of physical resources to each switch that is emulated, where the emulated switches are collectively used to mimic a data center switching fabric. In some embodiments, each emulated switch may be allocated or associated with one or more of ports 110 and the port association may be static or semi-static (e.g., particular ports may be assigned to an emulated switch for a given test session).

RA 106 may be any suitable entity or entities (e.g., software executing on a processor, an FPGA, an ASIC, or a combination of software, an FPGA, and/or an ASIC) for performing one or more aspects associated with allocating and managing emulated switches. In some embodiments, RA 106 may allocate and manage resources of ASIC switch(es) 108 for providing emulated switches without requiring a custom ASIC pipeline. In some embodiments, RA 106 can be external or internal to ASIC switch(es) 108.

In some embodiments, RA 106 may utilize one or more management ports or related interfaces for communicating with a controller or related applications (e.g., TC 104 and/or testing applications 114) and/or for communicating with ASIC switch(es) 108. For example, TC 104 or a related application may communicate with RA 106 via an out-of-band management port or related interface. In this example, RA 106 may send instructions or other communications to ASIC switch(es) 108 via another management port or related interface.

In some embodiments, RA 106 may include a virtual to physical adapter 112. Virtual to physical adapter 112 may be any suitable entity or entities (e.g., software executing on a processor, an FPGA, a ASIC, or a combination of software, an FPGA, and/or an ASIC) for converting and/or translating communications to refer to virtual or physical resources depending on the destination. For example, when requesting information about available switching resources via RA 106, testing applications 114 and/or SUT 118 may "see" a set of emulated switches each with a subset of resources instead of ASIC switch(es) 108. In this example, virtual to physical adapter 112 may translate information about virtual resources into information physical resources of a single ASIC switch (e.g., Tomahawk 3) and vice versa so that interacting nodes may remain unaware of the underlying ASIC switch(es) 108 or related switch resources.

In some embodiments, RA 106 and/or virtual to physical adapter 112 may reside between a native device interface and interacting entities (e.g., SUT 118, testing applications 114, or external devices) and may act as a communications proxy or agent using a virtual interface. For example, SUT 118 may include a network switch controller that configures switching resources by sending, via a virtual interface associated with RA 106, configuration requests for requesting and/or configuring one or more switches. In this example, RA 106 and/or virtual to physical adapter 112 may translate the configuration requests received via the virtual interface into one or more corresponding requests for transmission via a native switch interface, where the corresponding requests include commands for configuring appropriate physical resources of underlying ASIC switch(es) 108. Further, RA 106 and/or virtual to physical adapter 112 may translate switch performance results coming from a native switch interface into virtualized results (e.g., link status or counter values for a physical port '60' may be changed to values for a virtual port 'v1' on an emulated switch 'TORSW1') before sending the virtualized results to the network switch controller via the virtual interface.

In some embodiments, RA 106 and/or virtual to physical adapter 112 may create, store, and/or use switching fabric emulation data (e.g., physical to virtual port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 116, virtual ports 'v1', 'v2', 'v3' on an emulated switch 'TORSW1' may be translated into physical ports '60', '61', '62', respectively. In this example, configuration commands for setting speed of port 'v1' can be translated so that the speed of corresponding physical port '60' is set. Continuing with this example, to query the statistical counters for virtual port 'v1', the statistical counters for physical port '60' may be queried.

In some embodiments, RA 106 and/or virtual to physical adapter 112 may utilize a modified proprietary (e.g., vendor) API (e.g., a vendor's software development kit (SDK) or by utilizing a wrapper API that interacts with a vendor API. For example, by using a wrapper API, RA 106 can manage a virtualized or emulated fleet of switches using off-the-shelf or commodity ASICs with NOSes that utilize a proprietary or vendor API.

In some embodiments, RA 106 and/or virtual to physical adapter 112 may utilize a custom adaptor that handles certain applications or functions which may involve a subset of resource management and mapping requirements than a standard switching API. For example, by using a custom adaptor, RA 106 can manage a virtualized or emulated fleet of switches for certain use cases using off-the-shelf or commodity ASICs.

In some embodiments, test system 102 or entities thereof (e.g., TC 104, testing applications 114, and/or RA 106) may include functionality for accessing data storage 116. Data storage 116 may be any suitable entity or entities (e.g., a storage device, a non-transitory computer readable medium, or a storage system) for maintaining or storing information related to switching fabric emulation, network testing, or related test analysis. For example, data storage 116 may include switching fabric emulation data (e.g., physical to virtual port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 116 may also include test traffic models, test cases, test session data, topology information for emulated switching fabric environments and/or for SUT 118, and/or other information usable for generating performance metrics (e.g., statistics) associated with one or more aspects of SUT 118. In some embodiments, data storage 116 may be located at test system 102, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of TC 104, RA 106, and testing applications 114.

Figure 2:
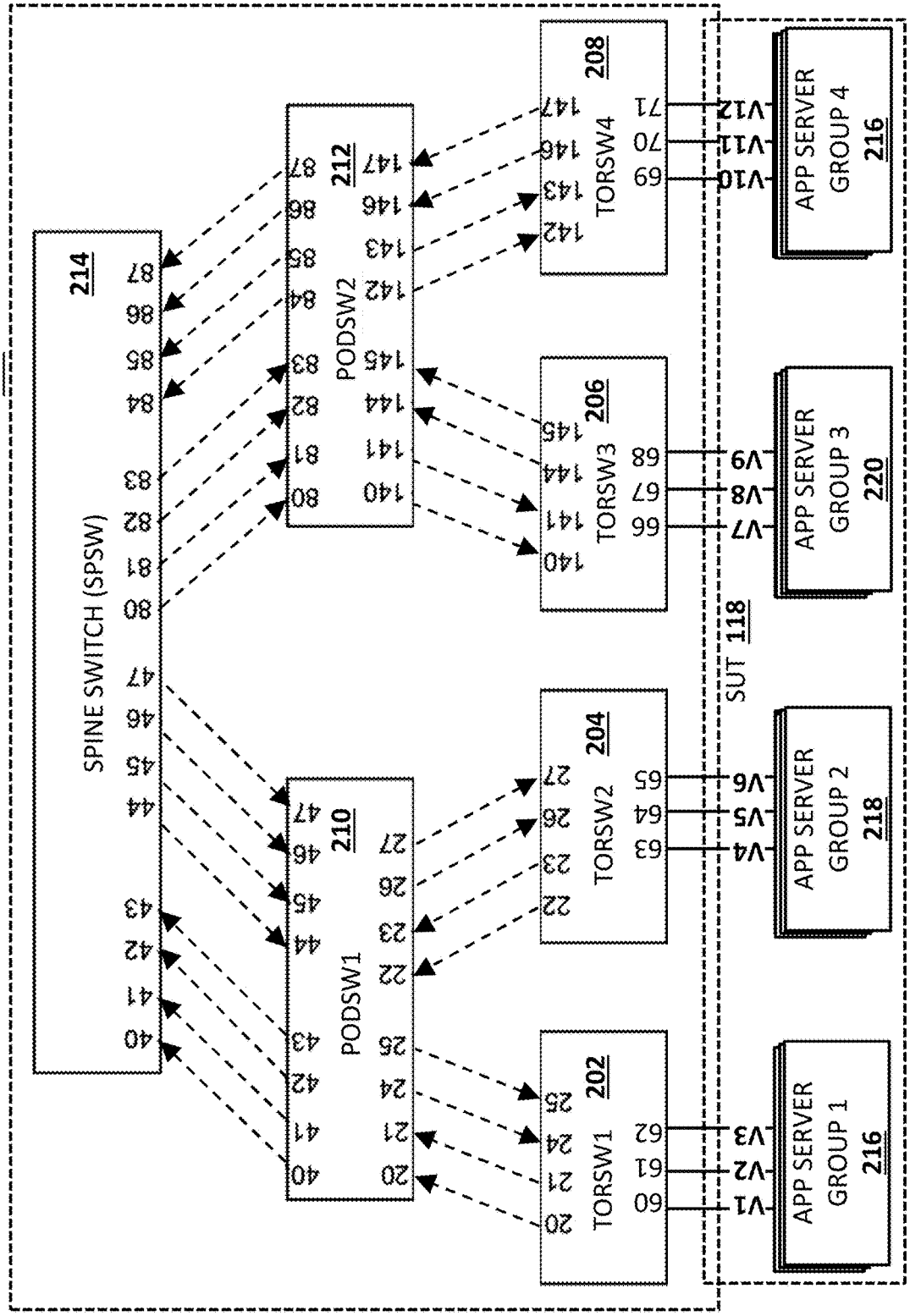
FIG. 2 is a diagram illustrating an example emulated switching fabric environment usable for network testing.

FIG. 2 is a diagram illustrating an example emulated switching fabric environment 200 usable for network testing. Emulated switching fabric environment 200 may represent an emulated data center environment comprising virtualized switching fabric elements (e.g., emulated switches) for forwarding packets from or to SUT 118 or other entities. For example, emulated switching fabric environment 200 may be based on user input and/or predetermined environment templates or data models, e.g., stored in data storage 116.

Referring to FIG. 2, emulated switching fabric environment 200 may represent a 3-stage Clos switching network comprising different stages of emulated switches, e.g., stage one may include top of rack (TOR) switches (TORSWs) 202-208, stage two may include cluster or pod switches (PODSWs) 210-212, and stage three may include a spine switch (SPSW) 214 and may be implemented using RA 106 and physical resources of one or more ASIC switch(es) 108. For example, TORSWs 202-208 may represent or emulate switches that are connected to multiple servers (e.g., located within a rack or nearby rack), PODSWs 210-212 may represent or emulate aggregation switches that are connected to multiple TORSWs, and SPSW 214 may represent or emulate a higher-level aggregation switch that is connected to multiple PODSWs.

In some embodiments, some physical ports of ASIC switch(es) 108 may be associated with different emulated switches and may utilize loopback interfaces or internal interfaces for emulating communications between some emulated switches, while other emulated switches (e.g., TORSWs 202-208) may utilize physical interfaces and/or physical cabling to communicate with SUT 118 or portions thereof.

In some embodiments, SUT 118 may represent or include a set of application server groups 216-222, each representing one or more servers and/or applications. For example, application server group 1 216 may include multiple servers (e.g., 16 or more servers in a single rack), each having one or more connections to a TOR switch. In some examples, a server of application server groups 216-222 may includes multiple applications or perform different services (e.g., machine learning (M/L), storage offload, search engines, webpages, video streaming, email, etc.) for users or may perform similar services for different sets of users. In some examples, a server of application server groups 216-222 may act as a client to another server.

In some embodiments, each of application server groups 216-222 may be connected (e.g., physically cabled) to a different set of physical ports 110 of test system 102, where each set of physical ports 110 is assigned or allocated to a particular emulated switch. For example, RA 106 may assign physical ports '60', '61', and '62' to an emulated switch 'TORSW1' and may virtualize those physical ports as 'v1', 'v2', and 'v3', respectively. In this example, applications and/or servers in application server group 1 216 may be communicatively coupled to one or more of the virtual ports of the emulated switch 'TORSW1'.

It will be appreciated that FIG. 2 is for illustrative purposes and that various depicted entities, their locations, and/or their functions described above in relation to FIG. 2 may be changed, altered, added, or removed.

FIG. 3 is a diagram illustrating example switching configuration information 300. In some embodiments, configuration information 300 may be accessed and/or stored by TC 104 and/or RA 106 using one or more data structures. In some embodiments, configuration information 300 may include any suitable information for mapping virtual ports associated with emulated switching fabric environment 200 to physical ports of physical ASIC switch(es) 108. In some embodiments, configuration information 300 may be stored or maintained in data storage 116 and may be usable for translating port information or related information in switch configuration commands, performance metrics, and/or other communications.

Referring to FIG. 3, configuration information 300 may be depicted using a table representing associations between a topology identifier (TID) and a corresponding topology description. In some embodiments, a TID may include any suitable identifier, such as one or more numbers or values, usable for identifying a switching topology or emulated switching fabric environment. For example, each switching topology or emulated switching fabric environment provided by a test operator or stored for testing may have a different, unique TID, e.g., 1, 2, 3, and 4, respectively.

In some embodiments, a topology description may include information for describing or defining an emulated switching fabric environment, e.g., emulated switching fabric environment 200. For example, a topology description may indicate the type of switching environment including the number of stages, the types and number of emulated switches and ports at each stage, along with various characteristics (e.g., port speeds, link speeds, forwarding rules, throughput limits, etc.) that can be used to emulate or virtualize the switching environment described.

It will be appreciated that configuration information 300 in FIG. 3 is for illustrative purposes and that different and/or additional information may also be stored or maintained. Further, it will be appreciated that configuration information 300 may be stored in various data structures, memories, media, and/or in one or more locations.

FIG. 4 is a diagram illustrating example port mapping data 400 for mapping virtual ports of emulated switches (e.g., TORSWs 202-208) to physical ports of physical ASIC switch(es) 108. In some embodiments, port mapping data 400 may be accessed and/or stored by TC 104 and/or RA 106 using one or more data structures. In some embodiments, port mapping data 400 may include any suitable information for mapping virtual ports associated with emulated switching fabric environment 200 to physical ports of physical ASIC switch(es) 108. In some embodiments, port mapping data 400 may be stored or maintained in data storage 116 and may be usable for translating port information or related information in switch configuration commands, performance metrics, and/or other communications.

Referring to FIG. 4, port mapping data 400 may be depicted using a table representing associations between virtual port information and physical port information. For example, each row or association may include a TID, an emulated switch identifier (ESID), a virtual port number, and a corresponding physical switch identifier (PSID) and a physical port number.

In some embodiments, a TID may include any suitable identifier, such as one or more numbers or values, usable for identifying a switching topology or emulated switching fabric environment. For example, a test operator may select a 3-stage Clos network environment with particular characteristics to emulate for a first test session, a 3-stage Clos network environment with different characteristics to emulate for a second test session, a 5-stage Clos network environment with particular characteristics to emulate for a third test session, and a 7-stage Clos network environment with particular characteristics to emulate for a fourth test session. In this example, each switching topology or emulated switching fabric environment may have a different, unique TID, e.g., 1, 2, 3, and 4, respectively.

In some embodiments, an ESID may include any suitable identifier, such as one or more numbers or values, usable for identifying an emulated switch. For example, emulated switching fabric environment 200 may have seven emulated switches, each switch having a unique name and/or number, e.g., 'TORSW1', 'A', '234553242', etc. In some embodiments, ESIDs may be unique within a topology or an emulated switching fabric environment. In some embodiments, ESID may be unique amongst multiple (or even all) defined topologies or emulated switching fabric environments.

In some embodiments, a virtual port number may include any suitable identifier, such as one or more numbers or values, usable for identifying a port of an emulated switch. For example, an emulated switch 'PODSW1' of emulated switching fabric environment 200 may have multiple virtual ports, each having a unique name and/or number at least within that emulated switch, e.g., 'v1', 'v2', 'v3', etc. In some embodiments, virtual port numbers may be unique within a topology or an emulated switching fabric environment. In some embodiments, virtual port numbers may be unique amongst multiple (or even all) defined topologies or emulated switching fabric environments.

In some embodiments, an ESID may include any suitable identifier, such as one or more numbers or values, usable for identifying a physical switch, e.g., physical ASIC switch(es) 108. For example, test system 102 may have one or two physical ASIC switch(es) 108, each switch having a unique name and/or number, e.g., 'SW1', 'A', '234553242', etc. In some embodiments, PSIDs may be unique within a test system or network. In some embodiments, ESID may be unique amongst multiple (or even all) networks controlled by an operator or service provider.

In some embodiments, a physical port number may include any suitable identifier, such as one or more numbers or values, usable for identifying a port of physical ASIC switch(es) 108. For example, physical ASIC switch(es) 108 may have multiple physical traffic ports, each having a unique name and/or number at least within each physical switch, e.g., '60', '61', '62', etc. In some embodiments, physical port numbers may be unique within each of physical ASIC switch(es) 108. In some embodiments, physical port numbers may be unique amongst multiple (or even all) physical ASIC switch(es) 108.

In some embodiments, e.g., where multiple emulated switching fabric environments (e.g., for different test sessions or network configurations) are stored, a TID, an ESID, and a virtual port number may be used as a combination key or value for identifying a corresponding physical switch and port. In some embodiments, e.g., where one emulated switching fabric environment 200 is stored, an ESID and a virtual port number may be used as a combination key or value for identifying a corresponding physical switch and port. In some embodiments, e.g., where each virtual port number is unique in emulated switching fabric environment 200, a virtual port number may be used as a combination key or value for identifying a corresponding physical switch and port.

It will be appreciated that port mapping data 400 in FIG. 4 is for illustrative purposes and that different and/or additional information may also be stored or maintained. Further, it will be appreciated that port mapping data 400 may be stored in various data structures, memories, media, and/or in one or more locations.

Figure 5:
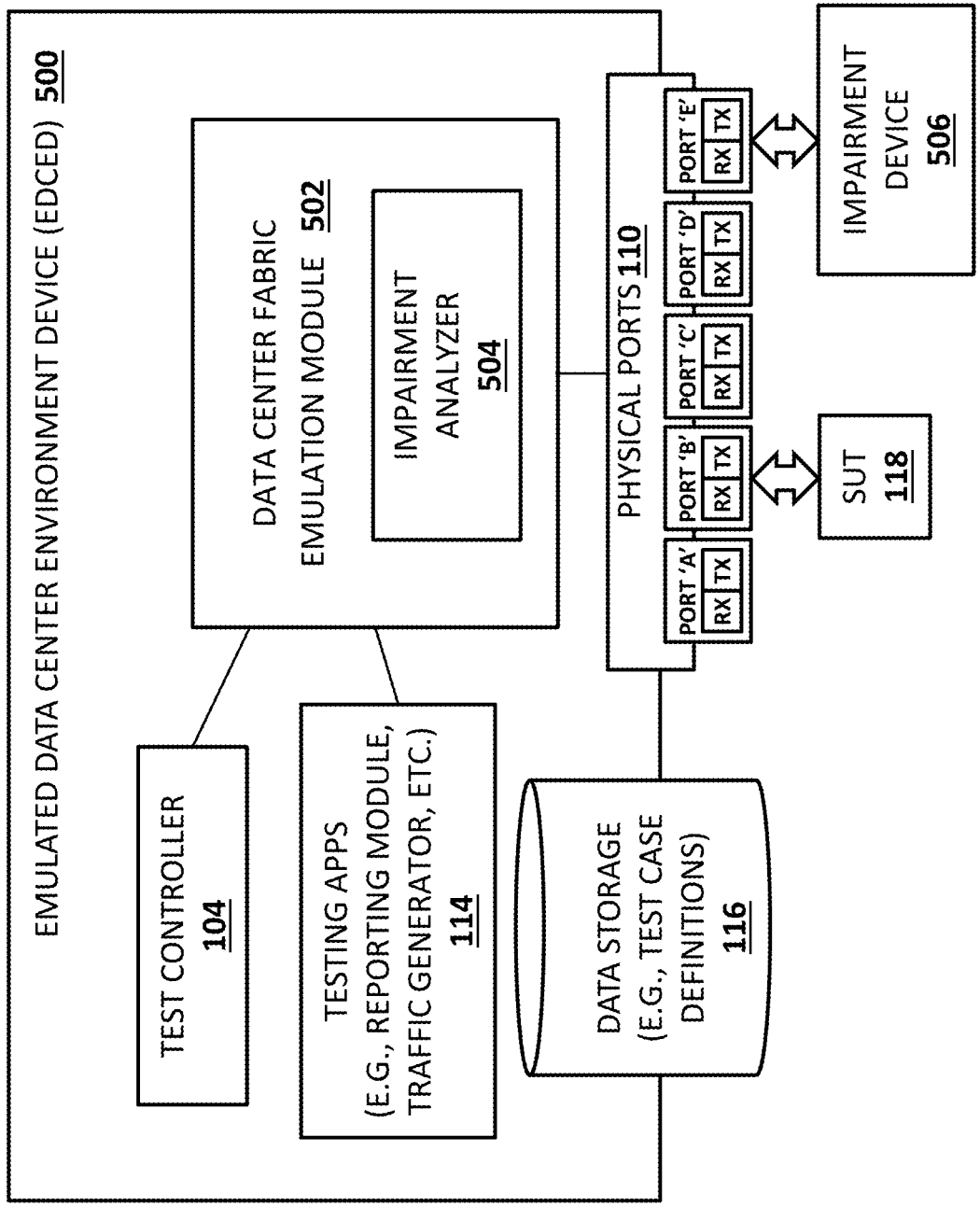
FIG. 5 is a diagram illustrating an example emulated data center environment device (EDCED) with internal loopbacks.

FIG. 5 is a diagram illustrating an example emulated data center environment device (EDCED) 500 with internal loopbacks. EDCED 500 may represent a computing platform (e.g., a stand-alone device or appliance comprising hardware, software, and firmware) configured to emulate one or more switching fabrics. EDCED 500 may also be configured to perform related functions associated with configuring, controlling, and/or interacting with an emulated switching fabric. For example, EDCED 500 may be configured to emulate a data center switching fabric (e.g., environment 200) comprising virtualized switching fabric elements implemented using physical ASIC resources. In this example, EDCED 500 may also include modules and/or software for emulating the data center switching fabric, for performing testing associated with the emulated data center switching fabric, and for monitoring traffic or related test performance associated with the emulated data center switching fabric.

In some embodiments, EDCED 500 may include at least some of the functionality described above with regard to test system 102. For example, EDCED 500 may include TC 104, testing apps 114, data storage 116, RA 106, physical ports 110 (e.g., multiple physical ports each comprising receive (Rx) and transmit (Tx) logical ports), a switching fabric emulation module (DCFEM) 502, and an impairment sensor(s)/analyzer 504.

DCFEM 502 may represent any suitable entity or entities (e.g., software in addition to hardware and/or firmware) for emulating a data center and/or a related switching fabric. In some embodiments, DCFEM 502 may include RA 106, adapter 112, and ASIC switches 108 or similar functionality to RA 106, adapter 112, and ASIC switches 108. In some embodiments, DCFEM 502 may include software for configuring, implementing, and controlling an emulated switching fabric for testing SUT 118 or DUTs therein.

In some embodiments, DCFEM 502 may include or interact with impairment sensor(s)/analyzer 504. Impairment sensor(s)/analyzer 504 may represent any suitable entity or entities (e.g., software in addition to hardware and/or firmware) for obtaining and/or analyzing performance information, e.g., BER metrics, delay metrics, etc. For example, impairment sensor(s)/analyzer 504 may include or interact with one or more monitoring agents or visibility modules that are adapted to monitor emulated switching fabric resource performance, e.g., bit error rate (BER), forward error correction (FEC) symbol error rate, etc.

In some embodiments, impairment sensor(s)/analyzer 504 may determine whether current impairment settings should be adjusted based on a predetermined target value or target range (e.g., provided by a test system user). In some embodiments, impairment sensor(s)/analyzer 504 may send a performance report or other information (e.g., periodically or aperiodically) to TC 104 and TC 104 may use this information for generating and sending an impairment feedback control signal to impairment device 506. In some embodiments, impairment sensor(s)/analyzer 504 may be capable of sending an impairment feedback control signal to impairment device 506 for controlling (e.g., adjusting) an impairment performed by or injected by impairment device 506.

In some embodiments, EDCED 500 may utilize internal loopbacks (e.g., media access control (MAC) layer or layer 2 loopbacks that are intrinsic to an ASIC device) to simulate a unidirectional, inter-switch link by feeding traffic back into an emulated switching fabric whereupon it is routed to a destination, e.g., an emulated switch. When an internal loopback is in effect, no external device may need to be connected to the physical port connector and the data path from transmit to receive may be entirely internal, e.g., via a MAC or SERDES loopback, each of which exercises different amounts of circuitry but is intended to be transparent.

In some embodiments, EDCED 500 may implement internal loopbacks by treating each port's pipeline as two independent resource halves, e.g., an ingress port resource (e.g., RX portion) and an egress port resource (e.g., TX portion). For example, software in EDCED 500 may associated a port half resource with a virtual port half. In this example, the software may mitigate conflicts with ASIC hardware, underlying software development kit (SDK) drivers, switch abstraction interface (SAI) wrappers, or NOS software. In some embodiments, VLANs, multicast groups, exclusion groups may be assigned to both ingress and egress ports resources or related port numbers.

In some embodiments, an external impairment device 506 (e.g., loopback dongle device with traffic impairment capabilities) may be connected via a single physical port (e.g., port 'E") of EDCED 500 and can simulate an impaired link (e.g., one-way directional data path). For example, where EDCED 500 is emulating a data center or related switching fabric, impairment device 506 may be connected to a single physical port (e.g., port 'E") of EDCED 500 and may introduce or simulate real-world degradation including delay, bit-errors, etc. on traffic that is to traverse one or more links (e.g., virtual or emulated links) associated with the single physical port (e.g., port 'E") of EDCED 500.

In some embodiments, by replacing an internal loopback with external impairment device 506, a formerly loopedback path may act as an impaired path. For example, external impairment device 506 may be inserted as an inline device into the middle of an emulated data center data path. In this example, impairment device 506 can add or inject impairments to the link including delay, bit errors, etc. Such errors can be used to simulate real-world impairments and thus can allow an emulated datacenter to more thoroughly exercise SUT 118.

In some embodiments, external impairment device 506 may not consume or use any extra ports because each loopback port or related resource(s) may already be configured for emulating a single direction of a bi-directional link.

In some embodiments, additional ports can used to allow inline insertion of impairments of SUT traffic going to or from an emulated switch, e.g., one of TORSWs 202-208. In such embodiments, the emulated switch may be programmed to route SUT traffic in one or both directions through another impairment device.

In some embodiments, e.g., in lieu of directly cabling SUT ports to an impairment device inline or enroute to an emulated ToR switch, a programmable "patch bay" can be used to allow SUT traffic to be routed through impairment devices without physical cabling. In such embodiments, extra delay or other impacts may be incurred by adding an extra hop through the switching fabric but, in many instances, this impact may be minor compared to an injected impairment.

In some embodiments, external impairment device 506 may inject or implement various link-level impairments. Example impairments may include a delay simulating a length of connection medium (e.g., a 90 meters spool of fiber optic cable), an electrical or optical degradation (e.g., using a serdes loopback plug or by changing analog parameters associated with an analog to digital converter), or an impairment for producing bit errors or FEC symbol errors.

It will be appreciated that FIG. 5 is for illustrative purposes and that various depicted entities, their locations, and/or their functions described above in relation to FIG. 1 may be changed, altered, added, or removed.

Figure 6:
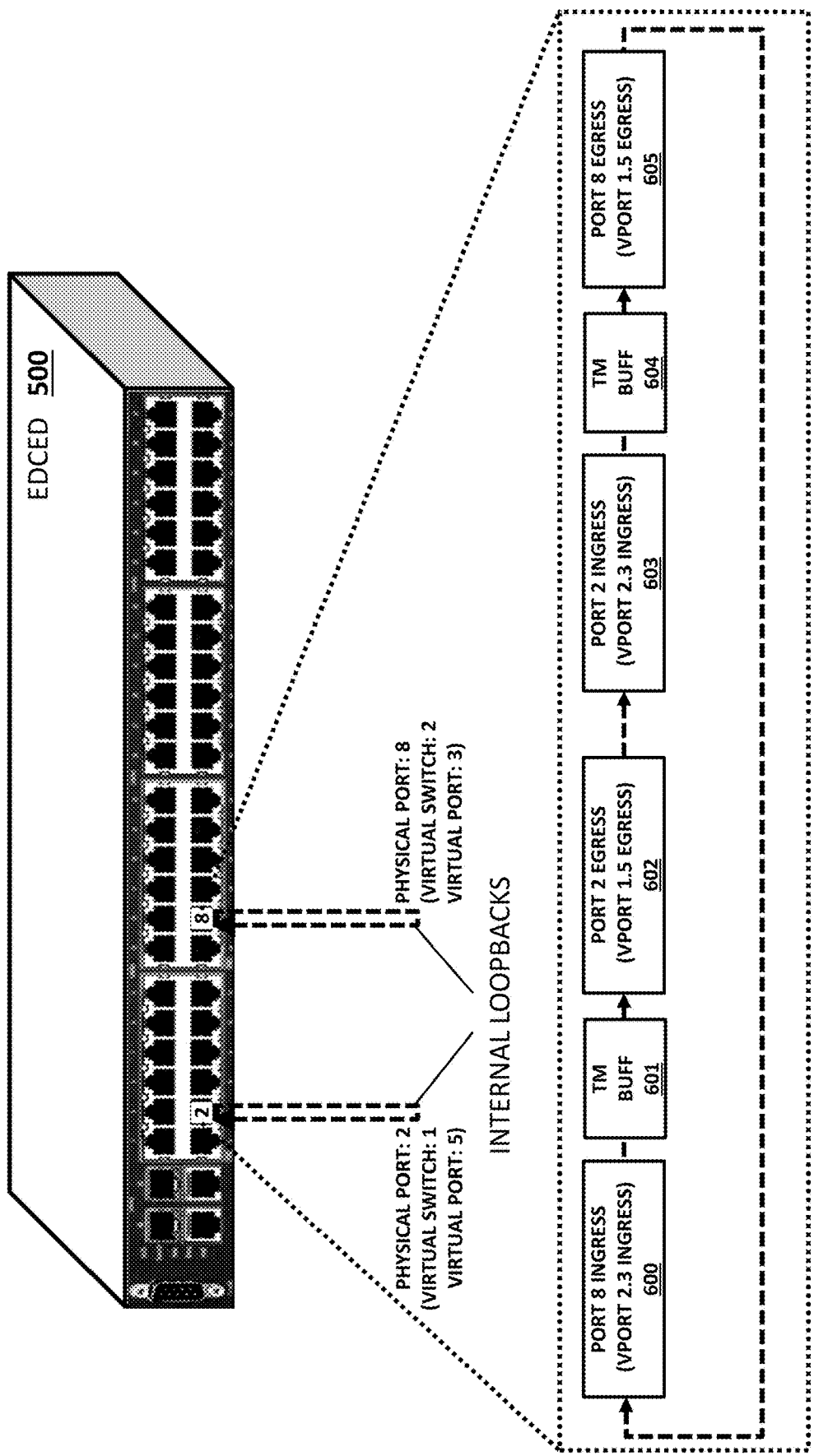
FIG. 6 is a diagram illustrating an example data path involving an internal loopback interconnect associated with two physical ports.

FIG. 6 is a diagram illustrating an example data path involving an internal loopback interconnect associated with two physical ports. Referring to FIG. 6, a port 8 ingress resource 600 may represent an ingress (Rx) virtual port resource (e.g., implemented using software and hardware) associated with a virtual port 3 of a virtual switch 2. Traffic may be sent to port 8 ingress resource 600 via an internal loopback, e.g., traffic may be originally received on a physical port 8. Received traffic may be buffered using transmission buffer 601. A port 2 egress resource 602 may represent a virtual port resource associated with a virtual port 5 of a virtual switch 1. Port 2 egress resource 602 may send traffic via an internal loopback to a port 2 ingress resource 603. Port 2 ingress resource 603 may represent an ingress (Rx) virtual port resource associated with a virtual port 3 of a virtual switch 2. Received traffic may be buffered using a transmission buffer 604. Port 8 egress resource 605 may represent an egress (Tx) virtual port resource associated with a virtual port 5 of a virtual switch 1. Port 8 egress resource 605 may send traffic via an internal loopback to a port 8 ingress resource 600.

It will be appreciated that FIG. 6 is for illustrative purposes and that various depicted entities, their locations, and/or their functions described above in relation to FIG. 6 may be changed, altered, added, or removed.

Figure 7:
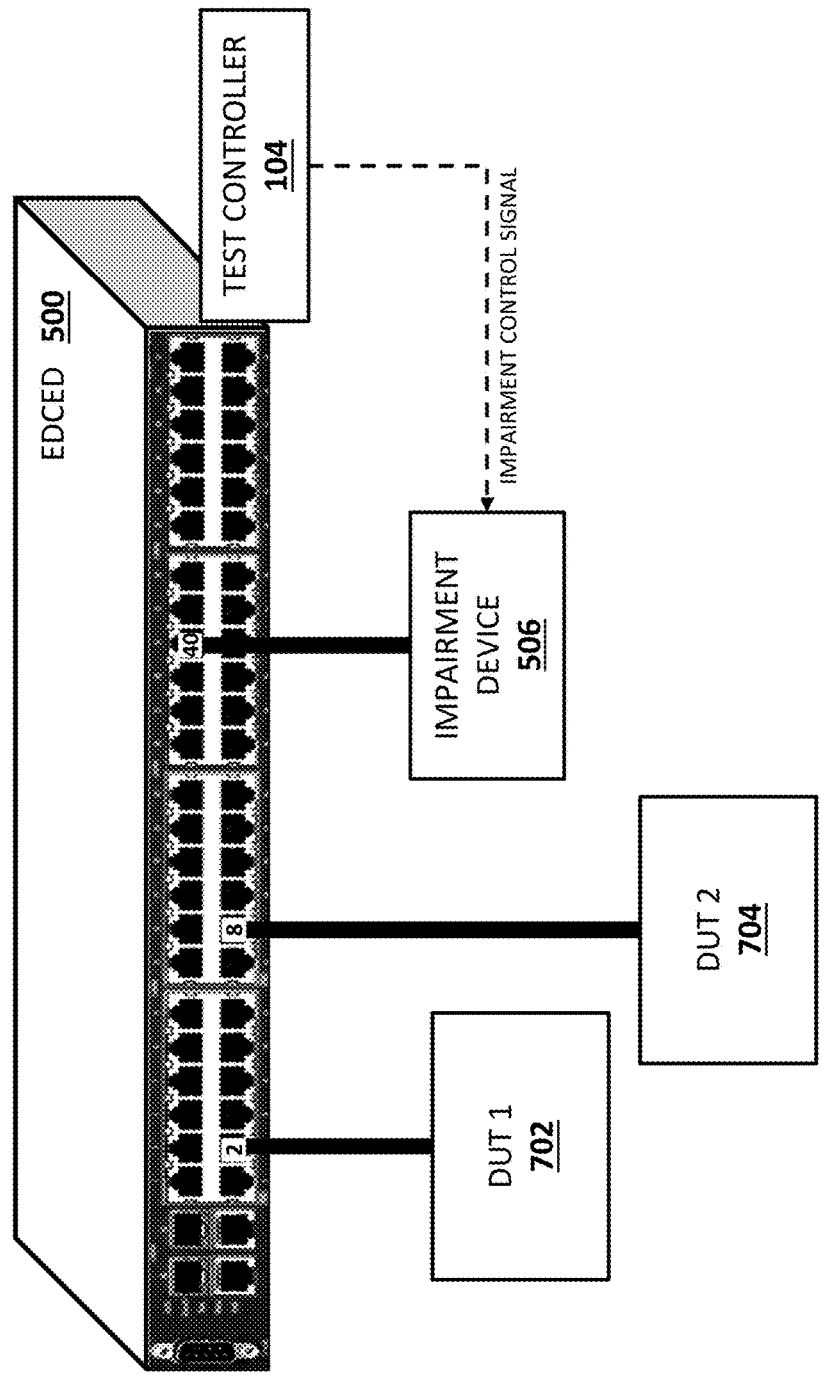
FIG. 7 is a diagram illustrating an example test environment for impairment testing using an impairment device.

FIG. 7 is a diagram illustrating an example test environment 700 for impairment testing using impairment device 506. In some embodiments, test environment may include EDCED 500, TC 104, impairment device 506, and one or more DUTs 702-704. For example, test environment 700 may be configured to test DUTs 702-704 (e.g., via ports '2' and '8' respectively) using test traffic, where at least some test traffic is impaired using impairment device 506. In this example, impairment device 506 (e.g., a loopback dongle or device) may be adapted to receive a flow of packets via one or more ingress lanes or portions of an associated link (e.g., connected via port '40') and to apply one or more tightly controlled impairments (e.g., introduce bit errors, etc.) and the impaired traffic flow is then sent back via one or more egress lanes or portions of the associated link.

In some embodiments, EDCED 500 or a module therein may include or interact with one or more monitoring agents or visibility modules that are adapted to monitor emulated switching fabric resource performance, e.g., BER, FEC symbol error rate, etc.

Referring to FIG. 7, TC 104 or related entities may include or interact with one or more visibility modules (e.g., within and/or external to EDCED 500) for obtaining and processing performance metrics or related information (e.g., external or internal event data) and may use this information in generating an impairment feedback control signal which may be usable for dynamically adjusting impairments being applied to packets transiting the emulated switching fabric, e.g., by impairment device 506.

In some embodiments, an impairment feedback control signal sent to impairment device 509 may be used to adjust an impairment (e.g., a serdes equalization setting, a chaos metric, a fuzz value, etc.) being applied to packets transiting the emulated switching fabric such that a chosen performance metric (e.g., BER) associated with a test session (e.g., an emulated switching fabric) is held at a predetermined value or within a predetermined value range.

It will be appreciated that FIG. 7 is for illustrative purposes and that various depicted entities, their locations, and/or their functions described above in relation to FIG. 7 may be changed, altered, added, or removed.

Figure 8:
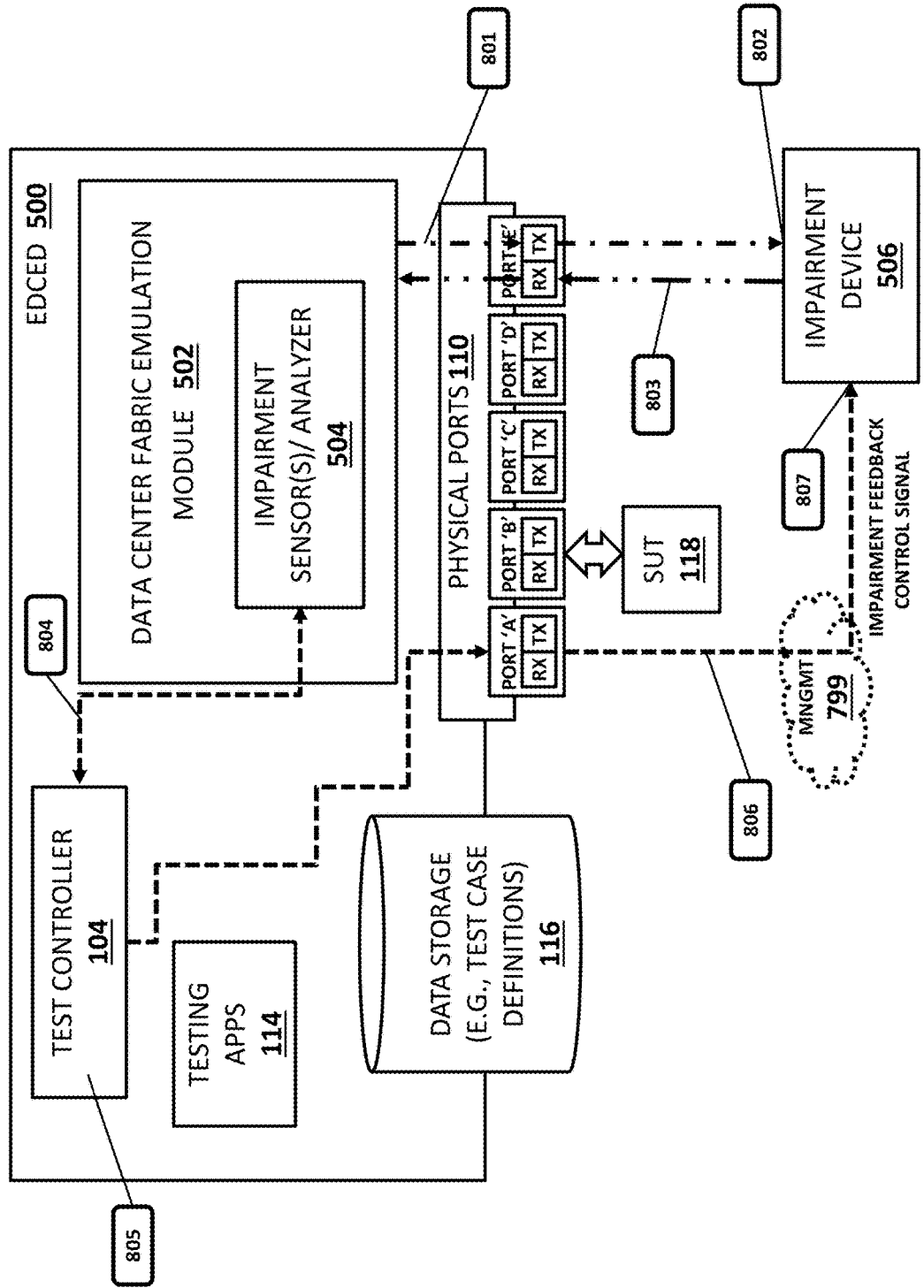
FIG. 8 is a diagram illustrating an example process for impairment testing using an impairment device and an external management network.

FIG. 8 is a diagram illustrating an example process 800 for impairment testing using an impairment device and an external management network 799. In some embodiments, process 800 may be utilized in test environment 700 comprising EDCED 500, impairment device 506, and an external management network 799. In such embodiments, management network 799 may be usable for communicating with impairment device 506, e.g., to send impairment feedback control signaling information and/or other information to impairment device 506.

Referring to process 800, in step 801, packet traffic may be transmitted from an emulated switching fabric via an egress side of a loopback port (e.g., Tx lane of port 'E') associated with EDCED 500.

In step 802, the packet traffic may be received at impairment device 506 (e.g., an inline loopback impairment hardware device) where one or more predetermined impairments are applied to packets in the packet flow (e.g., by manipulating a serdes equalization setting for introducing bit errors).

In step 803, the impaired packet traffic may be sent back from impairment device 506 to the emulated switching fabric, e.g., via Rx lane of port 'E'.

In step 804, impairment sensor(s)/analyzer 504 (e.g., network taps, monitoring agents, visibility modules, or traffic probes) may monitor various operational emulated switching fabric performance metrics (e.g., BER, FEC symbol error rate, etc.) associated with elements of an emulated switching fabric (e.g., links, switches, queues, processors, memory, etc.) and may report performance metrics of interest to TC 104.

In step 805, TC 104 may receive the performance metrics of interest and use this information along with target metric information (e.g., provided by a test system user) to generate an impairment feedback control signal that is intended to cause an observed metric value to move toward a target value or range, e.g., usable for attaining and/or maintaining a target BER, FEC symbol error rate, etc.

In step 806, the impairment feedback control signal may be communicated to impairment device 506 (e.g., an inline loopback impairment dongle or device) using an external management network 799, out-of-band signaling, or via an internal communication bus, e.g., an I2C or MDIO bus commonly used to manage pluggable transceivers.

In step 807, the impairment feedback control signal may be used by impairment device 506 to adjust one or more impairments being applied to packet traffic in real-time (or near real-time). For example, using an impairment feedback control signal, impairment device 506 may adjust a serdes equalization setting for increasing or decreasing bit errors in transiting packets.

It will be appreciated that process 800 is for illustrative purposes and that different and/or additional actions may be used. It will also be appreciated that various actions described herein may occur in a different order or sequence.

Figure 9:
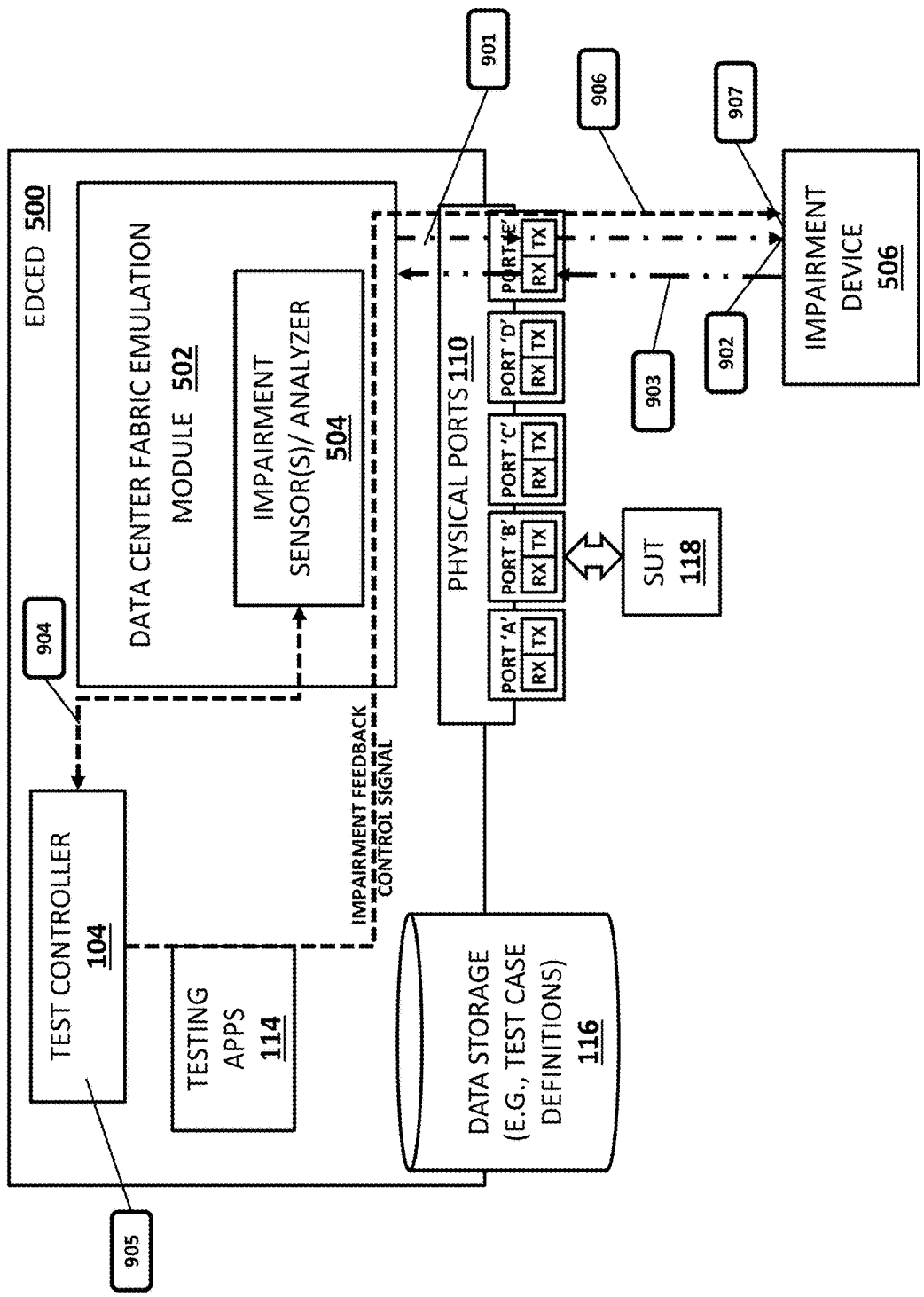
FIG. 9 is a diagram illustrating an example process for impairment testing using an impairment device and in-band signaling.

FIG. 9 is a diagram illustrating an example process 900 for impairment testing using an impairment device and in-band signaling. In some embodiments, process 900 may be utilized in test environment 700 comprising EDCED 500 and impairment device 506. In such embodiments, TC 104 may send, via in-band signaling, impairment feedback control signaling information and/or other information to impairment device 506.

Referring to process 900, in step 901, packet traffic may be transmitted from an emulated switching fabric via an egress side of a loopback port (e.g., Tx lane of port 'E') associated with EDCED 500.

In step 902, the packet traffic may be received at impairment device 506 (e.g., a loopback impairment hardware device) where one or more predetermined impairments are applied to packets in the packet flow (e.g., by manipulating a serdes equalization setting for introducing bit errors).

In step 903, the impaired packet traffic may be sent back from impairment device 506 to the emulated switching fabric, e.g., via Rx lane of port 'E'.

In step 904, impairment sensor(s)/analyzer 504 (e.g., network taps, monitoring agents, visibility modules, or traffic probes) may monitor various operational emulated switching fabric performance metrics (e.g., BER, FEC symbol error rate, etc.) associated with elements of an emulated switching fabric (e.g., links, switches, queues, processors, memory, etc.) and may report performance metrics of interest to TC 104.

In step 905, TC 104 may receive the performance metrics of interest and use this information along with target metric information (e.g., provided by a test system user) to generate an impairment feedback control signal that is intended to cause an observed metric value to move toward a target value or range, e.g., usable for attaining and/or maintaining a target BER, FEC symbol error rate, etc.

In step 906, the impairment feedback control signal may be communicated to impairment device 506 (e.g., a loopback impairment dongle or device) using an in-band signaling mechanism. Example impairment feedback control signal information may, for example, be placed within header fields of at least some of the packet traffic (e.g., inserted into INT headers, user defined header parameters, etc.). In some embodiments, impairment feedback control signal information may be placed in a command and control packet that is generated by TC 104 and the packet may be injected into the emulator's egress traffic stream.

In step 907, the impairment feedback control signal may be used by impairment device 506 to adjust one or more impairments being applied to packet traffic in real-time (or near real-time). For example, using an impairment feedback control signal, impairment device 506 may adjust a serdes equalization setting for increasing or decreasing bit errors in transiting packets.

It will be appreciated that process 900 is for illustrative purposes and that different and/or additional actions may be used. It will also be appreciated that various actions described herein may occur in a different order or sequence.

Figure 10:
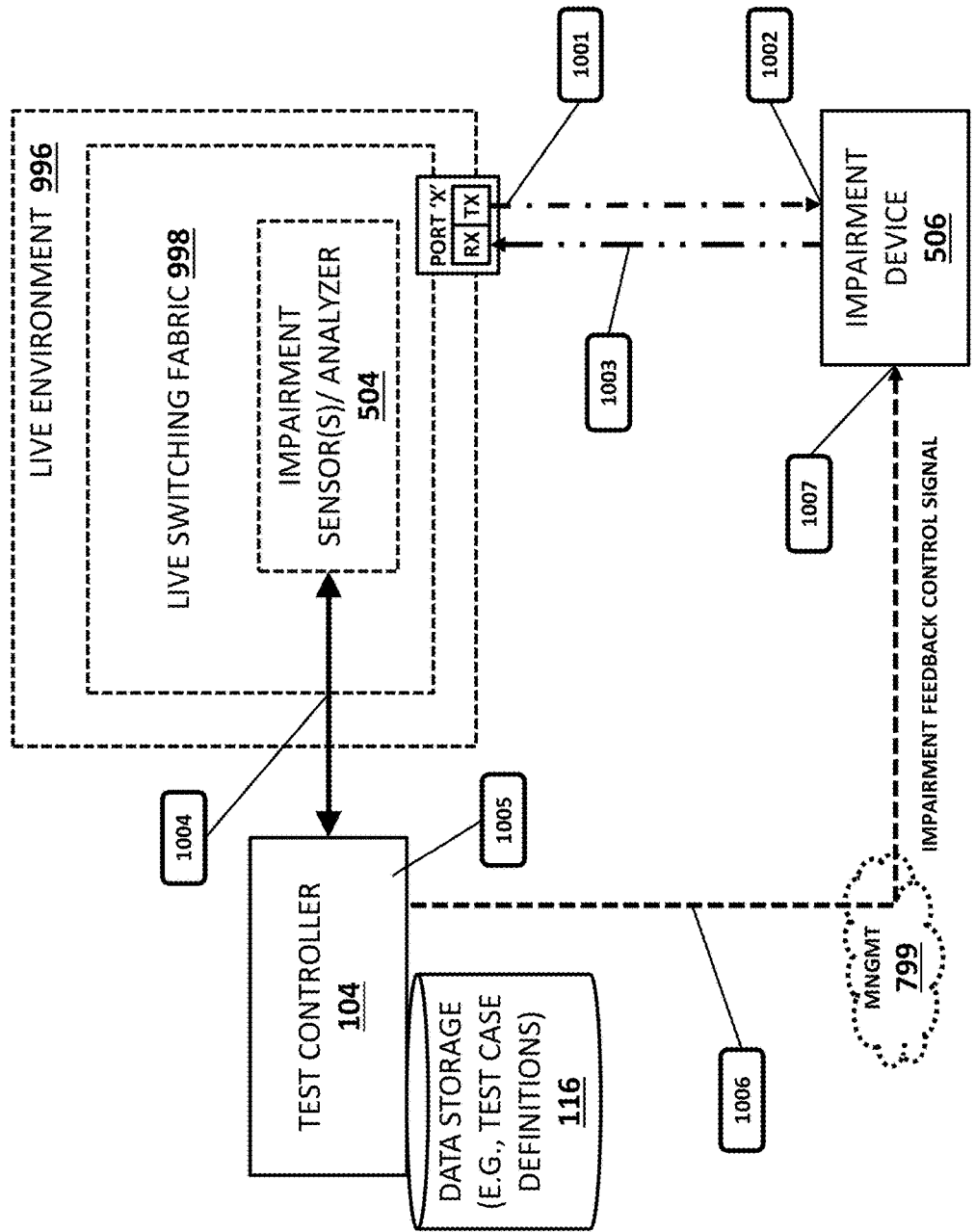
FIG. 10 is a diagram illustrating an example process for impairment testing using a live or non-emulated switching fabric.

FIG. 10 is a diagram illustrating an example process 1000 for impairment involving a live or non-emulated switching fabric 998. In some embodiments, process 900 may be utilized in test environment 700 comprising impairment device 506, TC 104, external management network 799, a live environment 996, and a live switching fabric 998. For example, live environment 996 may represent a production or non-test data center comprising a network of computers and related infrastructure performing various commercial related services. In this example, live switching fabric 998 may represent switching fabric elements including physical and virtual switches usable for routing or forwarding user traffic to one or more network nodes in live environment 996.

In some embodiments, live environment 996 and/or live switching fabric 998 may include or interact with one or more test system entities, e.g., TC 104, impairment sensor(s)/analyzer 504, EDCED 500 or an emulated switching fabric, impairment device 506, and/or other entities. For example, prior to testing live environment 996, a test system operator may insert and configure impairment sensor(s)/analyzer 504 to obtain and report performance metrics associated with live switching fabric 998 and may insert impairment device 506 for performing various impairments on traffic (e.g., test packets) to or from live environment 996.

Referring to process 1000, in step 1001, packet traffic may be transmitted from live switching fabric 998 via an egress side of a loopback port (e.g., Tx lane of port 'X') associated with live switching fabric element, e.g., a data center switch.

In step 1002, the packet traffic may be received at impairment device 506 (e.g., a loopback impairment hardware device) where one or more predetermined impairments are applied to packets in the packet flow (e.g., by manipulating a serdes equalization setting for introducing bit errors).

In step 1003, the impaired packet traffic may be sent back from impairment device 506 to live switching fabric 998, e.g., via Rx lane of port 'X'.

In step 1004, impairment sensor(s)/analyzer 504 (e.g., network taps, monitoring agents, visibility modules, or traffic probes) may monitor various operational switching fabric performance metrics (e.g., BER, FEC symbol error rate, etc.) associated with elements of live switching fabric 998 (e.g., links, switches, queues, processors, memory, etc.) and may report performance metrics of interest to TC 104.

In step 1005, TC 104 may receive the performance metrics of interest and use this information along with target metric information (e.g., provided by a test system user) to generate an impairment feedback control signal that is intended to cause an observed metric value to move toward a target value or range, e.g., usable for attaining and/or maintaining a target BER, FEC symbol error rate, etc.

In step 1006, the impairment feedback control signal may be communicated to impairment device 506 (e.g., a loopback impairment dongle or device) using one or more techniques, e.g., an external management network 799, out-of-band signaling, or via an internal communication bus.

In step 1007, the impairment feedback control signal may be used by impairment device 506 to adjust one or more impairments being applied to packet traffic in real-time (or near real-time). For example, using an impairment feedback control signal, impairment device 506 may adjust a serdes equalization setting for increasing or decreasing bit errors in transiting packets.

It will be appreciated that process 1000 is for illustrative purposes and that different and/or additional actions may be used. It will also be appreciated that various actions described herein may occur in a different order or sequence.

Figure 11:
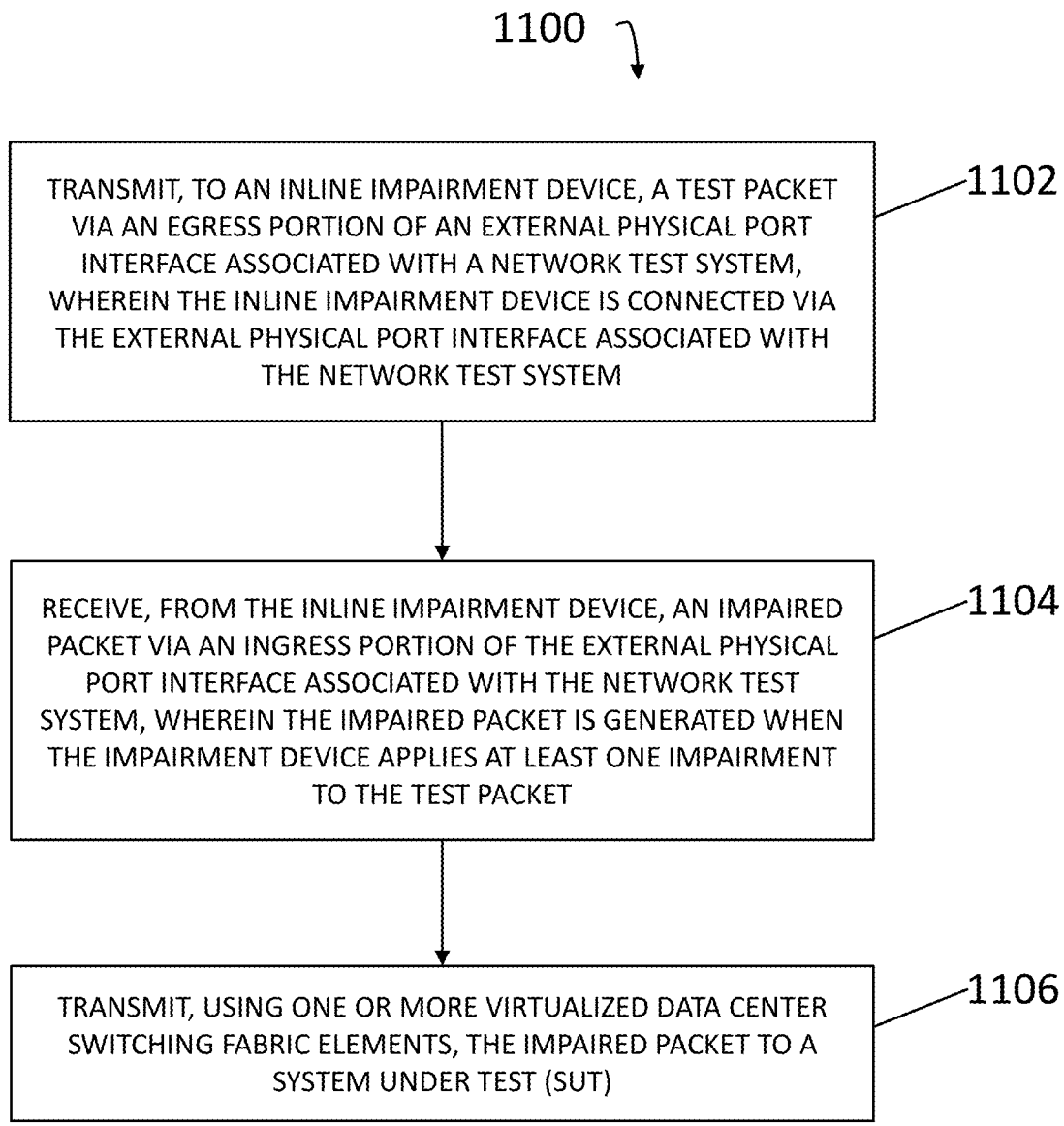
FIG. 11 is a diagram illustrating an example process for impairment testing using an impairment device.

FIG. 11 is a diagram illustrating an example process 1100 for impairment testing using an impairment device. In some embodiments, process 1100, or portions thereof, may be performed by or at test system 102, TC 104, RA 106, ASIC switch(es) 108, EDCED 500, and/or another node or module (e.g., a network test controller). In some embodiments, process 1100 may occur during a test session for testing SUT 118 and may include steps 1102-1106.

Referring to process 1100, in step 1102, a test packet may be transmitted to an inline impairment device (e.g., impairment device 506) via an egress portion (e.g., a lane or lanes) of an external physical port interface (e.g., port 'E' or port '40' of EDCED 500) associated with the network test system, wherein the inline impairment device is connected via the external physical port interface associated with the network test system. In some embodiments, an external physical port interface may be associated with the physical ASIC switching resources (e.g., of EDCED 500) and associated with a first virtualized data center switching fabric element implemented using a network test system (e.g., test system 102 or EDCED 500).

In step 1104, an impaired packet may be received from the inline impairment device (e.g., impairment device 506) via an ingress portion (e.g., a lane or lanes) of the external physical port interface (e.g., port 'E' or port '40' of EDCED 500) associated with the network test system. In some embodiments, an impaired packet may be generated when the impairment device applies at least one impairment to a received test packet.

In step 1106, the impaired packet may be transmitted, using one or more of the virtualized data center switching fabric elements, to a SUT. For example, test system 102 or EDCED 500 may include a network node emulator for processing impaired packets (e.g., after the impaired packets traverse SUT 118) and attempting to respond to the impaired packets as the network node. In another example, test system 102 or EDCED 500 may route or send the impaired packet onward to SUT 118 using one or more virtualized data center switching fabric elements.

In some embodiments, an egress portion of an external physical port interface may represent (e.g., emulate) an inter-switch egress port associated with a first virtualized data center switching fabric element implemented using the network test system and an ingress portion of the same external physical port interface may represent (e.g., emulate) an inter-switch ingress port associated with a second virtualized data center switching fabric element implemented using a network test system (e.g., test system 102 or EDCED 500).

In some embodiments, prior to transmitting a test packet to an inline impairment device, a network test system (e.g., test system 102 or EDCED 500) may be configured for receiving the test packet, determining a switching or routing rule associated with the test packet, and using the switching or routing rule to forward the test packet to the egress portion for impairment. In such embodiments, forwarding a test packet to an egress port may include sending the test packet to the egress portion via one or more hops (e.g., emulated or virtualized switches) through the emulated data center switching fabric.

In some embodiments, during a test session testing SUT 118, an impairment feedback control module (e.g., TC 104 or impairment sensor(s)/analyzer 504) configured for: receiving observed performance metric information associated with one or more switching fabric elements; analyzing the observed performance metric information and predetermined target metric information; generating an impairment feedback control signal for adjusting the impairment to cause an observed performance metric value to change toward a predetermined target value; and sending the impairment feedback control signal to the inline impairment device for adjusting the impairment.

In some embodiments, during a test session testing SUT 118, an inline impairment device may be configured for: receiving an impairment feedback control signal; and adjusting the at least one impairment being applied by the inline impairment device for subsequent packets that traverse the impairment device.

In some embodiments, an inline impairment device (e.g., impairment device 506) may be connected via a single external port interface associated with the network test system.

In some embodiments, an inline impairment device may be a loopback dongle or device, may be a sophisticated layer 1 impairment generator, and/or may be configurable or programmable by a tester or a user.

In some embodiments, a network test system may be a single device, platform, or appliance, e.g., EDCED 500.

In some embodiments, a SUT may include a production switching fabric element (e.g., a switch in live switching fabric 998), a network node, a server, a network interface card, an application server, or a group of servers.

In some embodiments, e.g., where SUT 118 includes a production switching fabric element (e.g., a switch in live switching fabric 998), at least some packets from SUT 118 may be impaired by a local impairment device (e.g., an impairment device 506 located in or near live environment 996).

In some embodiments, a reporting module (e.g., testing apps 114 or impairment sensor(s)/analyzer 504) associated with a network test system may monitor, analyze, and report a performance impact of at least impairment on an emulated data center switching fabric (e.g., environment 200) or a SUT (e.g., SUT 118) connected to the network test system.

In some embodiments, at least one impairment (e.g., performed by impairment device 506) may include a physical layer impairment, a delay simulating a length of connection medium, an electrical or optical degradation, an impairment for producing bit errors, and an impairment for producing forward error correction (FEC) symbol errors.

In some embodiments, TC 104, testing applications 114, RA 106, and/or other test system entities (e.g., in EDCED 500) may communicate via a test system API or a related server. In such embodiments, the test system API or the related server may convert or translate higher-level instructions (e.g., a gRPC API request for performance information) or data models into lower level instructions (e.g., an ASIC register query) or data models for the physical ASIC switch.

It will be appreciated that process 1100 is for illustrative purposes and that different and/or additional actions may be used. It will also be appreciated that various actions described herein may occur in a different order or sequence.

It should be noted that test system 102, TC 104, RA 106, EDCED 500, and/or functionality described herein may constitute one or more special purpose computing devices. Further, test system 102, TC 104, RA 106, EDCED 500, and/or functionality described herein can improve the technological field of testing networks and related nodes by providing techniques and mechanisms for impairing test environments that utilize an impairment device (e.g., impairment device 506) and/or a switching fabric emulation device, e.g., EDCED 500.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for impairment testing using an impairment device, the method comprising:
    during a test session for testing a system under test (SUT) and at a network test system comprising physical application-specific integrated circuit (ASIC) switching resources, wherein the network test system emulates a data center switching fabric comprising virtualized data center switching fabric elements:
        transmitting, to an inline impairment device, a test packet via an egress portion of an external physical port interface associated with the network test system, wherein the inline impairment device is connected via the external physical port interface associated with the network test system;
        receiving, from the inline impairment device, an impaired packet via an ingress portion of the external physical port interface associated with the network test system, wherein the impaired packet is generated when the impairment device applies at least one impairment to the test packet; and
        transmitting, using one or more of the virtualized data center switching fabric elements, the impaired packet to the SUT.

2. The method of claim 1 wherein the egress portion represents an inter-switch egress port associated with a first virtualized data center switching fabric element implemented using the network test system and wherein the ingress portion represents an inter-switch ingress port associated with a second virtualized data center switching fabric element implemented using the network test system.

3. The method of claim 1 comprising:
    prior to transmitting the test packet:
        receiving the test packet;
        determining a switching or routing rule associated with the test packet; and
        using the switching or routing rule to forward the test packet to the egress portion for impairment.

4. The method of claim 3 wherein forwarding the test packet to the egress portion includes sending the test packet to the egress portion via one or more hops through the emulated data center switching fabric.

5. The method of claim 1 wherein the inline impairment device is a loopback dongle or device, is a sophisticated layer 1 impairment generator, or is configurable or programmable by a tester or a user.

6. The method of claim 1 comprising:
    during the test session and at an impairment feedback control module:
        receiving observed performance metric information associated with one or more switching fabric elements;
        analyzing the observed performance metric information and predetermined target metric information;
        generating an impairment feedback control signal for adjusting the impairment to cause an observed performance metric value to change toward a predetermined target value; and
        sending the impairment feedback control signal to the inline impairment device for adjusting the impairment.

7. The method of claim 6 wherein adjusting the impairment comprises:
    during the test session and at the inline impairment device:
        receiving the impairment feedback control signal; and
        adjusting the at least one impairment being applied by the inline impairment device for subsequent packets that traverse the impairment device.

8. The method of claim 1 wherein the SUT includes a production switching fabric element, a network node, a server, a network interface card, an application server, or a group of servers.

9. The method of claim 1 wherein the at least one impairment includes a physical layer impairment, a delay simulating a length of connection medium, an electrical or optical degradation, an impairment for producing bit errors, and an impairment for producing forward error correction (FEC) symbol errors.

10. A system for impairment testing using an impairment device, the system comprising:
   physical application-specific integrated circuit (ASIC) switching resources;
   a network test system comprising the physical ASIC switching resources, wherein the network test system emulates a data center switching fabric comprising virtualized data center switching fabric elements, wherein the network test system is configured for:
   during a test session for testing a system under test (SUT):
      transmitting, to an inline impairment device, a test packet via an egress portion of an external physical port interface associated with the network test system, wherein the inline impairment device is connected via the external physical port interface associated with the network test system;
      receiving, from the inline impairment device, an impaired packet via an ingress portion of the external physical port interface associated with the network test system, wherein the impaired packet is generated when the impairment device applies at least one impairment to the test packet; and
      transmitting, using one or more of the virtualized data center switching fabric elements, the impaired packet to the SUT.

11. The system of claim 10 wherein the egress portion represents an inter-switch egress port associated with a first virtualized data center switching fabric element implemented using the network test system and wherein the ingress portion represents an inter-switch ingress port associated with a second virtualized data center switching fabric element implemented using the network test system.

12. The system of claim 10 wherein the network test system is further configured for:
   prior to transmitting the test packet:
      receiving the test packet;
      determining a switching or routing rule associated with the test packet; and
      using the switching or routing rule to forward the test packet to the egress portion for impairment.

13. The system of claim 12 wherein forwarding the test packet to the egress portion includes sending the test packet to the egress portion via one or more hops through the emulated data center switching fabric.

14. The system of claim 10 wherein the inline impairment device is a loopback dongle or device, is a sophisticated layer 1 impairment generator, or is configurable or programmable by a tester or a user.

15. The system of claim 10 comprising:
   an impairment feedback control module configured for:
   during the test session:
      receiving observed performance metric information associated with one or more switching fabric elements;
      analyzing the observed performance metric information and predetermined target metric information;
      generating an impairment feedback control signal for adjusting the impairment to cause an observed performance metric value to change toward a predetermined target value; and
      sending the impairment feedback control signal to the inline impairment device for adjusting the impairment.

16. The system of claim 15 wherein adjusting the impairment comprises:
   during the test session and at the inline impairment device:
      receiving the impairment feedback control signal; and
      adjusting the at least one impairment being applied by the inline impairment device for subsequent packets that traverse the impairment device.

17. The system of claim 10 wherein the SUT includes a production switching fabric element, a network node, a server, a network interface card, an application server, or a group of servers.

18. The system of claim 10 wherein the SUT includes a production switching fabric element and wherein at least some packets from the SUT are impaired by the inline impairment device or a second impairment device located locally to the SUT.

19. The system of claim 10 wherein the at least one impairment includes a physical layer impairment, a delay simulating a length of connection medium, an electrical or optical degradation, an impairment for producing bit errors, and an impairment for producing forward error correction (FEC) symbol errors.

20. A non-transitory computer readable medium having stored thereon executable instructions embodied in the non-transitory computer readable medium that when executed by at least one processor of a network test system cause the network test system to perform steps comprising:
   during a test session for testing a system under test (SUT) and at a network test system comprising physical application-specific integrated circuit (ASIC) switching resources, wherein the network test system emulates a data center switching fabric comprising virtualized data center switching fabric elements:
      transmitting, to an inline impairment device, a test packet via an egress portion of an external physical port interface associated with the network test system, wherein the inline impairment device is connected via the external physical port interface associated with the network test system;
      receiving, from the inline impairment device, an impaired packet via an ingress portion of the external physical port interface associated with the network test system, wherein the impaired packet is generated when the impairment device applies at least one impairment to the test packet; and
      transmitting, using one or more of the virtualized data center switching fabric elements, the impaired packet to the SUT.

* * * * *